United States Patent
Cheong et al.

(10) Patent No.: US 9,588,948 B2
(45) Date of Patent: Mar. 7, 2017

(54) APPARATUS AND METHOD FOR EDITING DOCUMENT IMAGE

(71) Applicant: UNIDOCS CO., LTD., Seoul (KR)

(72) Inventors: Ghi-Tai Cheong, Gyeonggi-do (KR);
Seok-Kyun Koo, Gyeonggi-do (KR);
Don Donghoon Choi, Seoul (KR);
Yong-Tae Jeon, Seoul (KR);
Kwang-Wan Yang, Gyeonggi-do (KR)

(73) Assignee: Unidocs Co., Ltd., Seoul (KR)

( * ) Notice: Subject to any disclaimer, the term of this patent is extended or adjusted under 35 U.S.C. 154(b) by 161 days.

(21) Appl. No.: 14/525,359

(22) Filed: Oct. 28, 2014

(65) Prior Publication Data
US 2015/0149897 A1 May 28, 2015

(30) Foreign Application Priority Data
Nov. 25, 2013 (KR) .......................... 10-2013-0144058
Mar. 6, 2014 (KR) .......................... 10-2014-0026823

(51) Int. Cl.
*G06F 17/20* (2006.01)
*G06F 17/24* (2006.01)
*G06F 17/22* (2006.01)

(52) U.S. Cl.
CPC .......... *G06F 17/24* (2013.01); *G06F 17/2229* (2013.01)

(58) Field of Classification Search
CPC ........................................... G06F 17/24
See application file for complete search history.

(56) References Cited

U.S. PATENT DOCUMENTS

| | | | |
|---|---|---|---|
| 2007/0183000 A1* | 8/2007 | Eisen | H04N 1/00864 358/452 |
| 2012/0159296 A1* | 6/2012 | Rebstock | G06Q 10/00 715/205 |
| 2013/0332878 A1 | 12/2013 | Sung | |
| 2014/0078179 A1* | 3/2014 | Mistry | G09G 5/00 345/660 |

FOREIGN PATENT DOCUMENTS

| | | |
|---|---|---|
| JP | 2002-207725 A | 7/2002 |
| JP | 2011-232984 A | 11/2011 |
| KR | 10-2007-0042684 A | 4/2007 |
| KR | 10-2011-0017694 A | 2/2011 |
| KR | 10-2011-0027210 A | 3/2011 |

OTHER PUBLICATIONS

"http://www.adobe.com/products/acrobat/editing-pef-documents.html", Acrobat XI, Adobe Korea, 2013.

* cited by examiner

*Primary Examiner* — Stephen Hong
*Assistant Examiner* — Shahid Khan
(74) *Attorney, Agent, or Firm* — Renner, Otto, Boisselle & Sklar, LLP.

(57) ABSTRACT

An apparatus and method for editing a document are disclosed. The apparatus is installed on a first terminal, that is, a mobile terminal of a user, in order to edit a document of a document file stored in the first terminal. The apparatus includes a document storage unit and an edited document generation unit. The document storage unit stores at least one document file. The edited document generation unit extracts an area of interest from a document file stored in the document storage unit and displayed on a display unit of the first terminal, and generates an edited document. The document file is a portable document format (PDF) file.

4 Claims, 35 Drawing Sheets

APPARATUS AND METHOD FOR EDITING DOCUMENT IMAGE

CROSS-REFERENCE TO RELATED APPLICATIONS

This application claims the benefit of Korean Patent Application Nos. 10-2013-0144058 and 10-2014-0026823, filed on Nov. 25, 2013 and Mar. 6, 2014, respectively, which are hereby incorporated by reference in their entirety into this application.

BACKGROUND OF THE INVENTION

1. Technical Field

The present invention relates generally to an apparatus and method for editing a document and, more particularly, to an apparatus and method for editing a document, which are capable of generating a new edited document by intelligently extracting and combining important parts of a portable document format (PDF) file stored in the mobile terminal of a user or the mobile terminal of another user.

2. Description of the Related Art

PDF is a type of document format, and is configured to include a common document, a letter, a shape, a picture and a font. The PDF is well established as an important document format for transferring information between users.

The greatest advantage of a PDF file is compatibility. That is, a PDF file may be read and printed on most personal computers (PCs) regardless of the operating system. Furthermore, a distributed PDF file is identical to an original document, and maintains information about a source file, such as text, a drawing, an image and graphics, even when a PDF file is created using any program. Furthermore, a variety of types of formats may be gathered into a single PDF portfolio.

Furthermore, a PDF file is easy to manage. More specifically, a PDF file is smaller than other types of files. The reason for this is that an image and text can be all included in a single file. In the case of a picture file format, such as JPEG, a 100-page book may be converted into a total of 100 files. In this case, it is difficult to search for a desired part because the number of files is large. If PDF is used, however, a copy of a book may be converted into a single file. In this case, a desired part may be easily searched for via bookmark and link functions.

Furthermore, a PDF file has excellent security features. A security function is used not only when the file is opened, but fields, such as printing, copying and editing, may also be restricted. For this reason, many public institutes and laboratories all over the world widely use PDF files when distributing reports.

Recently, as the use of mobile terminals has suddenly increased, the necessity to open a PDF file using a mobile terminal has also increased. Furthermore, as the amount of content that may be viewed through a mobile terminal, in particular, the size of a PDF file increases, it is necessary for the user of the mobile terminal to extract or edit only pieces of information required for a relatively small display.

As a related technology, Korean Patent Application Publication No. 10-2011-0027210 discloses a PDF conversion system.

SUMMARY OF THE INVENTION

Accordingly, the present invention has been made keeping in mind the above problems occurring in the conventional art, and an object of the present invention is to implement a technology for enabling a user to scrap only required information in a document file. In particular, an object of the present invention is to extract and store important parts of a PDF file so that the important parts are suitable to be viewed on the limited size screen of the display of a mobile terminal.

Another object of the present invention is to provide a technology for editing a document among a plurality of terminals having excellent lightness and security.

In accordance with an aspect of the present invention, there is provided an apparatus for editing a document, the apparatus being installed on a first terminal, that is, a mobile terminal of a user, in order to edit a document of a document file stored in the first terminal, the apparatus including a document storage unit configured to store at least one document file; and an edited document generation unit configured to extract an area of interest from a document file stored in the document storage unit and displayed on a display unit of the first terminal, and to generate an edited document; wherein the document file is a portable document format (PDF) file.

The edited document generation unit may further include an editing space file generation unit configured to generate an editing space file that is an initial file used to generate the edited document; a clipping mask generation unit configured to generate a clipping mask used to extract the area of interest; an area-of-interest extraction unit configured to extract the area of interest corresponding to the clipping mask from the document file; and an edited document processing unit configured to copy the extracted area of interest to the editing space file, and to process the edited document.

The document file may be configured to include an entity corresponding to at least one of a letter, an image and a moving image; and the area-of-interest extraction unit is further configured to extract the area of interest from the document file in a state in which attributes of the entity are maintained so that the entity included in the extracted area of interest is able to be selected and copied.

The clipping mask may include a clipping line that is a boundary line having a specific shape in accordance with user settings or predetermined settings; and the area-of-interest extraction unit may be further configured to extract a region within the clipping line from the document file as the area of interest.

The document file may be configured to include a predetermined confidential region and a predetermined non-confidential region; and the edited document generation unit may be further configured to include a security determination unit configured to determine security of the extracted area of interest by determining whether the extracted area of interest corresponds to either the confidential region or the non-confidential region.

The security determination unit may be further configured to, if the document file includes a letter, determine the security of the extracted area of interest by determining whether or not a region in which a letter reduced in a ratio set by a user or in a predetermined ratio is present corresponds to the confidential region.

The edited document generation unit may further include an entity attribute determination unit configured to determine an entity attribute of the extracted area of interest.

The edited document generation unit may further include a copy region determination unit configured to determine a copy region, which belongs to the extracted area of interest and will be copied to the editing space file, based on the security of the extracted area of interest and the entity attribute.

The copy region determination unit may further include a data deletion unit configured to determine the copy region by deleting data corresponding to a part that belongs to the extracted area of interest and that corresponds to the confidential region; and an effect processing unit configured to perform effect processing set by a user or predetermined effect processing on the region deleted by the data deletion unit.

The data deletion unit may further include a bounding box computation unit configured to compute a minimum square-shaped bounding box including a clipping line, that is, a boundary line of the clipping mask; a coordinate system conversion unit configured to convert a page coordinate system, that is, a coordinate system based on a page of the document file into an image coordinate system, that is, a coordinate system based on an image present in the document file; a bounding box coordinate conversion unit configured to convert the bounding box into the image coordinate system; and a deletion processing unit configured to delete data, corresponding to the confidential region included in a conversion bounding box and a part placed outside the conversion bounding box, based on the conversion bounding box converted into the image coordinate system.

The effect processing unit may be further configured to perform shading processing on the deleted region in order for a user not to view the part corresponding to the confidential region.

The apparatus may further include a streaming execution unit configured to access a second terminal of another user using another apparatus for editing a document and to visualize a second document file, that is, a document file stored in the second terminal, on the display unit of the first terminal in a streaming manner.

The edited document generation unit may be further configured to extract an area of interest from the second document file, visualized in the first terminal, in response to a user manipulation using the first terminal via the streaming execution unit and to generate an edited document.

In accordance with an aspect of the present invention, there is provided a method of editing a document, the method including accessing, by a streaming execution unit, a second terminal of a second user via a first terminal of a first user; visualizing, by the streaming execution unit, a second document file, which is selected by the first user in the first terminal and is a document file of a predetermined sharing folder of the second terminal, on a display unit of the first terminal in a streaming manner; and extracting, by an edited document generation unit, an area of interest from the second document file visualized on the display unit of the first terminal in a streaming manner in response to a manipulation of the first user, and generating, by the edited document generation unit, an edited document; wherein the document file is a portable document format (PDF) file.

Generating the edited document may include generating an editing space file that is an initial file used to generate the edited document; generating a clipping mask used to extract the area of interest; extracting the area of interest corresponding to the clipping mask from the second document file; and copying the extracted area of interest to the editing space file, and processing the edited document.

The second document file may be configured to include an entity corresponding to at least one of a letter, an image and a moving image; and extracting the area of interest may include extracting the area of interest from the second document file in a state in which an entity attribute are maintained so that the entity included in the extracted area of interest is able to be selected and copied.

The clipping mask may be formed by a clipping line that is a boundary line having a specific shape in accordance with user settings or predetermined settings; and extracting the area of interest may include extracting a region within the clipping line from the second document file as the area of interest.

The second document file may be configured to include a predetermined confidential region and a non-confidential region; and generating the edited document may further include determining security of the extracted area of interest by determining whether the extracted area of interest corresponds to either the confidential region or the non-confidential region.

Generating the edited document may further include determining an entity attribute of the extracted area of interest; and determining a copy region, which belongs to the extracted area of interest and will be copied to the editing space file, based on the security of the extracted area of interest and the entity attribute; and determining the copy region may include deleting data corresponding to a part that belongs to the extracted area of interest and that corresponds to the confidential region, thereby determining the copy region; and performing effect processing set by a user or predetermined effect processing on the region deleted by a data deletion unit.

Deleting the data may include computing a minimum square-shaped bounding box including a clipping line, that is, a boundary line of the clipping mask; converting a page coordinate system, that is, a coordinate system based on a page of the second document file, into an image coordinate system, that is, a coordinate system based on an image present in the second document file; converting the bounding box into the image coordinate system; and deleting data, corresponding to the confidential region included in a conversion bounding box and a part placed outside the conversion bounding box, based on the conversion bounding box converted into the image coordinate system; and performing the effect processing may include performing shading processing on the deleted region in order for a user not to view the part corresponding to the confidential region.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
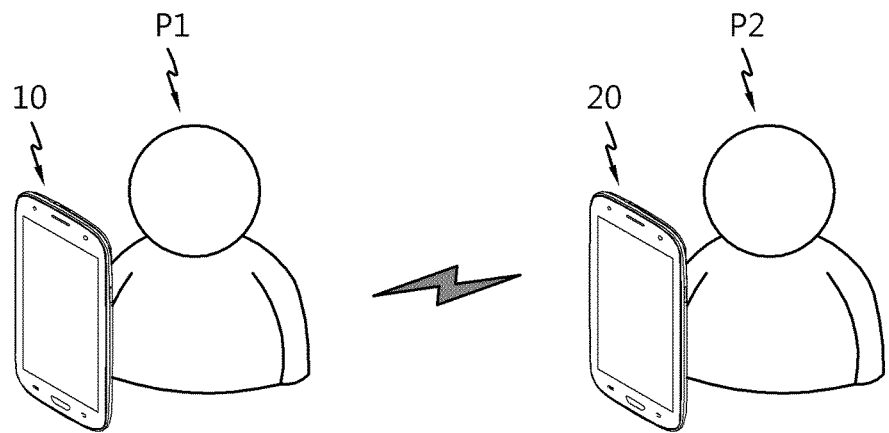
FIG. 1 is a conceptual diagram illustrating an environment to which an apparatus and method for editing a document according to embodiments of the present invention are applied.

Embodiments of the present invention are described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clear.

An apparatus for editing a document according to an embodiment of the present invention is described with reference to the accompanying drawings.

FIG. 1 is a conceptual diagram illustrating an environment to which an apparatus and method for editing a document according to embodiments of the present invention are applied.

Referring to FIG. 1, a first user P1 may employ a technology for editing a document according to an embodiment of the present invention using a first terminal 10, and a second user P2 may employ the same technology for editing a document using a second terminal 20. That is, the technology for editing a document according to an embodiment of the present invention is an application installed on a terminal, and may be used by the user of the corresponding terminal. Furthermore, a technology for generating an edited document according to an embodiment of the present invention may be employed in such a manner that the first user P1 may access the second terminal 20 of the second user P2 through the first terminal 10, and may edit a document file of the second terminal 20. Although FIG. 1 illustrates only communication between the first user P1 and the second user P2, the present invention is not limited thereto. For example, a document may be edited through communication among a plurality of users.

The first terminal 10 and the second terminal 20 may include laptop computers, mobile phones, tablet PCs, navigation systems, smart phones, personal digital assistants (PDAs), portable multimedia players (PMPs), or digital broadcasting receivers, such as digital video broadcasting (DVD) receivers.

The configuration and operation of the apparatus for editing a document according to this embodiment of the present invention are described below.

Figure 2:
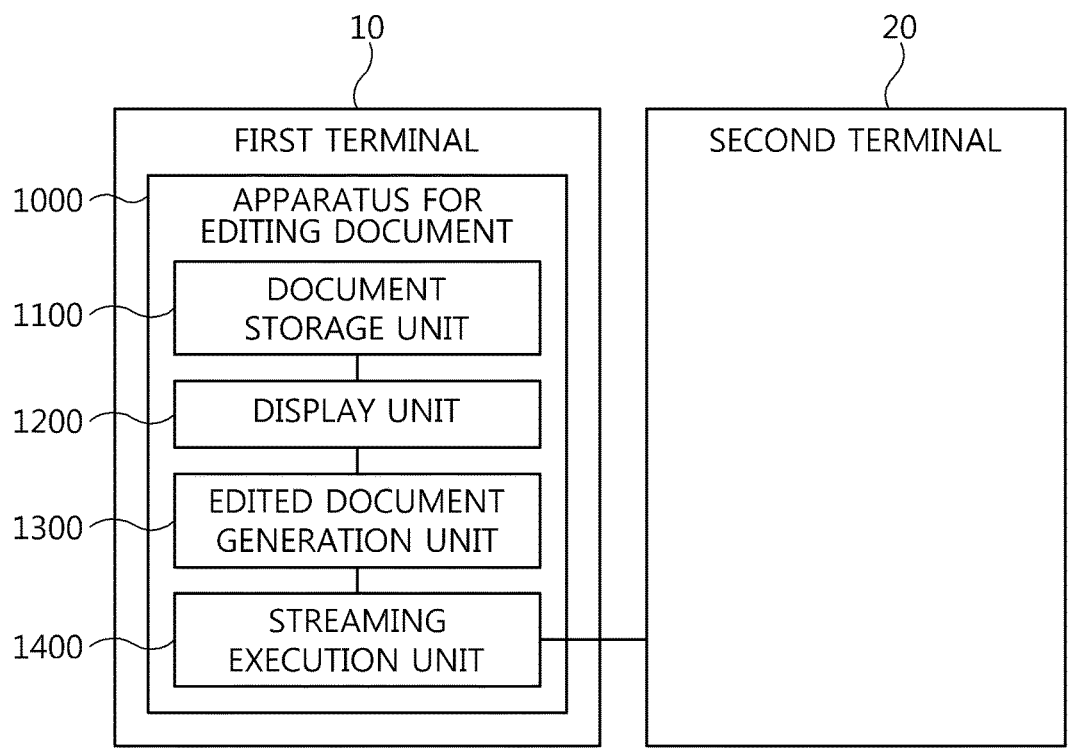
FIG. 2 is a block diagram illustrating the configuration of an apparatus for editing a document according to an embodiment of the present invention.
Figure 3:
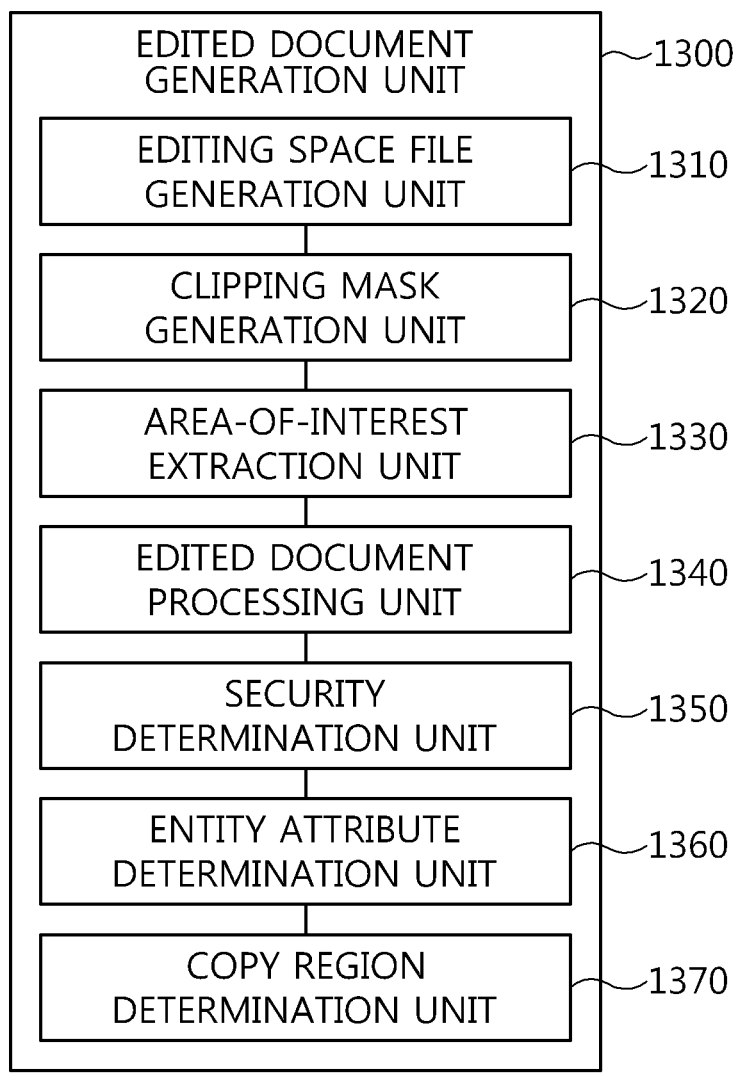
FIG. 3 is a diagram illustrating the configuration of the edited document generation unit of the apparatus for editing a document according to an embodiment of the present invention.
Figure 4:
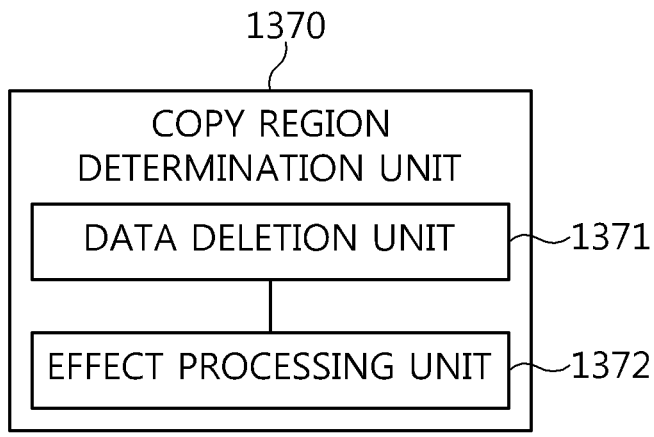
FIG. 4 is a diagram illustrating the configuration of the copy region determination unit of the apparatus for editing a document according to an embodiment of the present invention.
Figure 5:
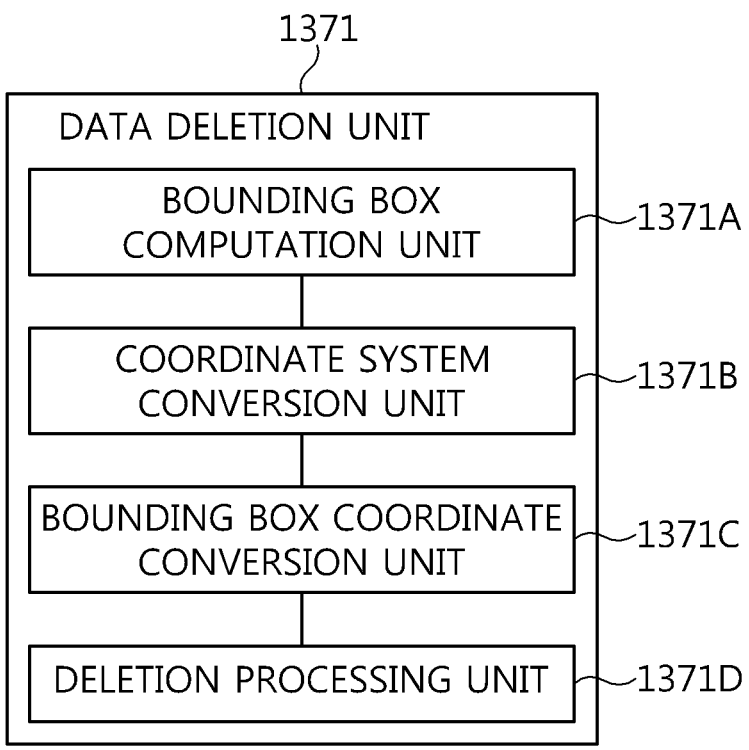
FIG. 5 is a diagram illustrating the configuration of the data deletion unit of the apparatus for editing a document according to an embodiment of the present invention.

FIG. 2 is a block diagram illustrating the configuration of an apparatus for editing a document according to an embodiment of the present invention, FIG. 3 is a diagram illustrating the configuration of the edited document generation unit of the apparatus for editing a document according to an embodiment of the present invention, FIG. 4 is a diagram illustrating the configuration of the copy region determination unit of the apparatus for editing a document according to an embodiment of the present invention, and FIG. 5 is a diagram illustrating the configuration of the data deletion unit of the apparatus for editing a document according to an embodiment of the present invention.

Referring to FIG. 2, the apparatus 100 for editing a document according to this embodiment of the present invention is mounted on a first terminal 10, and includes a document storage unit 1100, a display unit 1200, and an edited document generation unit 1300. In an embodiment, the apparatus 100 for editing a document may further include a streaming execution unit 1400.

The apparatus 100 for editing a document may further include an interface unit (not illustrated). In this case, the display unit 1200 may be the screen of the display of a terminal. The display unit 1200 visualizes related output content in accordance with a variety of types of instructions that are selected by a user through the interface unit, which will be described later.

The interface unit may be the input means of a terminal, which is configured to receive input from a user. The display unit 1200 and the interface unit may be integrated with each other. That is, the display unit 1200 and the interface unit may take the form of a touch display.

The document storage unit 1100 stores at least one document file. In this case, the document file may be a PDF file.

Furthermore, the document file may include a confidential region and a non-confidential region predetermined by a document creator. Furthermore, the document file includes an entity corresponding at least one of a letter, an image and a moving image, and is formed such that the entity is selected and copied in response to a user selection.

The edited document generation unit 1300 functions to extract an area of interest from a document file displayed on the display unit 1200 of the first terminal and to generate an edited document.

Referring to FIG. 3, the edited document generation unit 1300 includes an editing space file generation unit 1310, a clipping mask generation unit 1320, an area-of-interest extraction unit 1330, and an edited document processing unit 1340. In an embodiment, the edited document generation unit 1300 may further include a security determination unit 1350, an entity attribute determination unit 1360, and a copy region determination unit 1370.

The editing space file generation unit 1310 functions to generate an editing space file, that is, an initial file that is used to generate an edited document. More specifically, the editing space file is a space in which a specific region is extracted from a document file stored in the terminal of a user or the terminal of another user and is then copied. The editing space file may be an empty file including no content prior to editing.

In this case, in an embodiment, the document file may be a PDF file. Accordingly, the editing space file may be an empty PDF file including no content (or no data).

The clipping mask generation unit 1320 functions to generate a clipping mask that is used to generate an area of interest.

The area-of-interest extraction unit 1330 functions to extract an area of interest, corresponding to the clipping mask, from the document file.

The clipping mask is a reference (or a boundary) for the selection of an area of interest, that is, a specific region to be extracted from the document file. That is, a user extracts the area of interest, corresponding to the clipping mask, from the document file through touch manipulation using the interface unit.

In this case, the clipping mask may be formed by a clipping line, that is, a boundary line having a specific shape (e.g., a heart shape or a star shape) based on user settings or predetermined settings. In this case, the area-of-interest extraction unit 1330 extracts a region present within the clipping line from the document file as the area of interest.

The document file may include a predetermined confidential region and a non-confidential region. The document file may be formed using any single entity attribute of a letter, an image and a moving image.

The confidential region may be considered to be a region including personal information (e.g., a resident registration number or a telephone number) that should not be extracted and copied from the document file in accordance with user settings or a predetermined policy. Furthermore, the confidential region may be a part that the owner of a document file does not want to disclose.

In this case, the security determination unit 1350 functions to determine the security of the extracted area of interest by determining whether the area of interest extracted by the area-of-interest extraction unit 1330 corresponds to either a confidential region or a non-confidential region.

More specifically, the security determination unit 1350 determines whether a confidential region is included in the area of interest extracted by the area-of-interest extraction unit 1330.

The entity attribute determination unit 1360 functions to determine the entity attribute of the area of interest extracted by the area-of-interest extraction unit 1330.

That is, the entity attribute determination unit 1360 determines whether the entity attribute is a letter, image or moving image attribute.

In this case, if the document file corresponds to a letter attribute, the security determination unit 1350 may determine security based on whether a region in which a letter reduced in a ratio set by a user or in a predetermined ratio is present corresponds to a confidential region.

Although a very small part of a region in which a letter is present is included in a confidential region, a person may not commonly identify the letter using only the very small part because of the characteristics of the letter. Accordingly, the region in which the letter is present is reduced in a ratio set by a user or in a predetermined ratio, and the reduced region may be configured not to be copied only when it is included in the confidential region.

Furthermore, the copy region determination unit 1370 functions to determine a copy region, which belongs to the area of interest extracted by the area-of-interest extraction unit 1330 and will be copied to the editing space file, based on the security determined by the security determination unit 1360 and the entity attribute determined by the entity attribute determination unit 1360.

That is, all the area of interest extracted by the area-of-interest extraction unit 1330 is not copied to the editing space file, but a copy region, that is, a region that is actually copied, is determined by taking into consideration the security and the entity attribute.

The edited document processing unit 1340 functions to copy the area of interest, extracted by the area-of-interest extraction unit 1330, to the editing space file.

In this case, when the copy region is determined by the copy region determination unit 1370, the edited document processing unit 1340 may copy only the copy region determined by the copy region determination unit 1370.

Referring to FIG. 4, the copy region determination unit 1370 includes a data deletion unit 1371, and an effect processing unit 1372.

More specifically, the data deletion unit 1371 functions to determine the copy region by deleting data corresponding to a part that belongs to the area of interest extracted by the area-of-interest extraction unit 1330 and that corresponds to a confidential region.

Furthermore, the effect processing unit 1372 functions to perform effect processing set by a user or predetermined effect processing on the region deleted by the data deletion unit 1371.

In this case, the effect processing unit 1372 may perform shading processing on the deleted region so that a user is unable to view the part corresponding to the confidential region. For example, the deleted region may be processed in black so that a user is unable to view the confidential region.

Referring to FIG. 5, the data deletion unit 1371 includes a bounding box computation unit 1371a, a coordinate system conversion unit 1371b, a bounding box coordinate conversion unit 1371c, and a deletion processing unit 1371d.

More specifically, the bounding box computation unit 1371a functions to compute a bounding box in a minimum square form which includes a clipping line, that is, the boundary line of the clipping mask.

The coordinate system conversion unit 1371b functions to convert a page coordinate system, that is, a coordinate system based on a page of the document file, into an image coordinate system, that is, a coordinate system based on an image present in the document file.

The bounding box coordinate conversion unit 1371c functions to convert the bounding box into the image coordinate system.

Furthermore, the deletion processing unit 1371d functions to delete data, corresponding to a confidential region included in a conversion bounding box and a part placed outside the conversion bounding box, based on the conversion bounding box converted into the image coordinate system.

The streaming execution unit 1400 functions to receive a document file stored in the second terminal, that is, the terminal of another user, through the first terminal, that is, the terminal of a user in a streaming manner.

More specifically, the streaming execution unit 1400 is configured to send and receive data to and from another terminal. That is, the streaming execution unit 1400 may access the terminal of a user and perform the task of generating edited document. In this case, the connection among a plurality of terminals may be established by sharing a PIN when the same Wi-Fi subnet is used.

Furthermore, the streaming execution unit 1400 of the first terminal functions to access the second terminal of another user which uses another apparatus for editing a document and to visualize a second document file, that is, a document file stored in the second terminal, on the display unit of the first terminal in a streaming manner. In this case, the edited document generation unit 1300 may extract an area of interest from the second document file visualized on the first terminal through the streaming execution unit 1400 in response to the user manipulation of the first terminal, and may generate an edited document. In this case, the second document file is a document file stored in the second terminal, and may be a PDF file.

Examples in which an apparatus and method for editing a document according to embodiments of the present invention are implemented in a terminal in the form of applications are described below.

FIGS. 6 to 12 are diagrams illustrating an example of the apparatus for editing a document according to an embodiment of the present invention.

Figure 6:
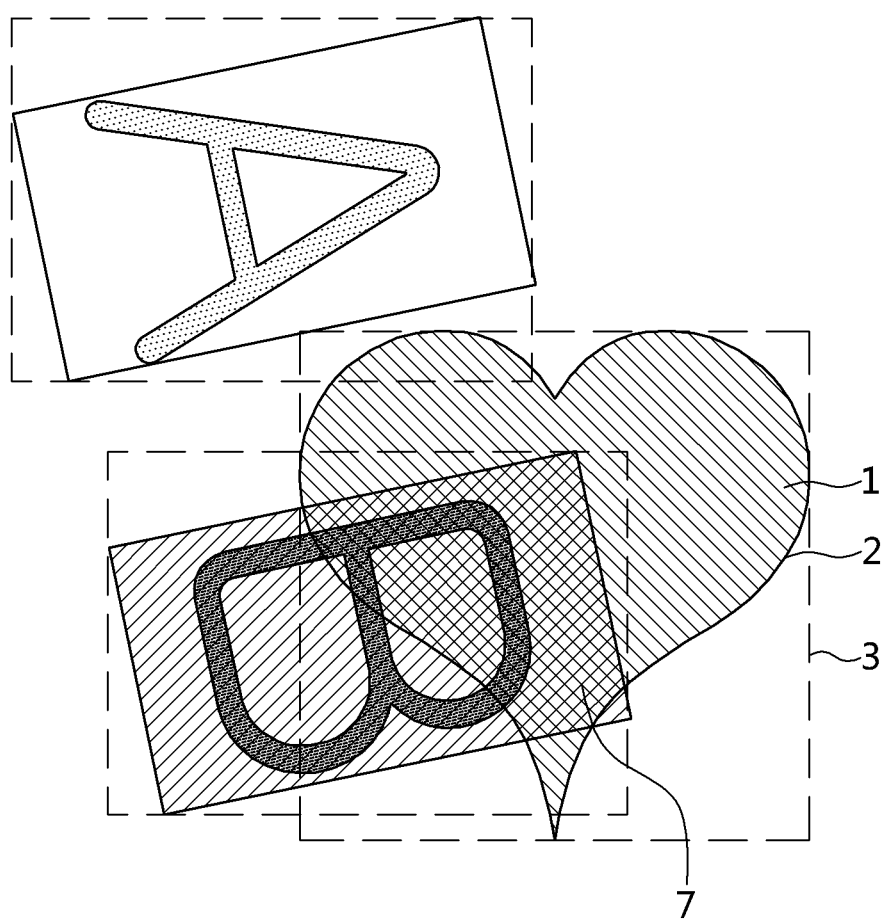
FIGS. 6 to 12 are diagrams illustrating an example of the apparatus for editing a document according to an embodiment of the present invention.

Referring to FIG. 6, letters "A" and "B" are present in a document file. In the document file, there are a clipping mask 1 having a clipping line 2, that is, a heart-shaped boundary line, and a minimum square-shaped bounding box 3 including the clipping line 2, that is, the boundary line of the clipping mask 1.

More specifically, the area-of-interest extraction unit 1330 extracts a region 7 that overlaps the clipping line 2, that is, the boundary line of the clipping mask 1, from the letter "B" as an area of interest.

In contrast, the area-of-interest extraction unit 1330 does not extract an area of interest from the letter "A" because there is no region that overlap the clipping line 2, that is, the boundary line of the clipping mask 1.

Figure 7:
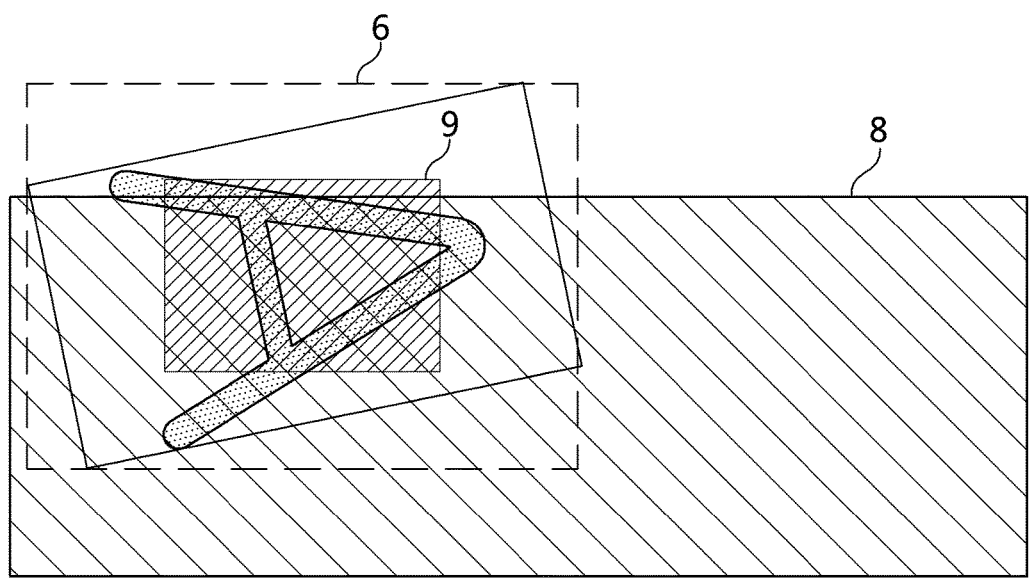
Figure 8:
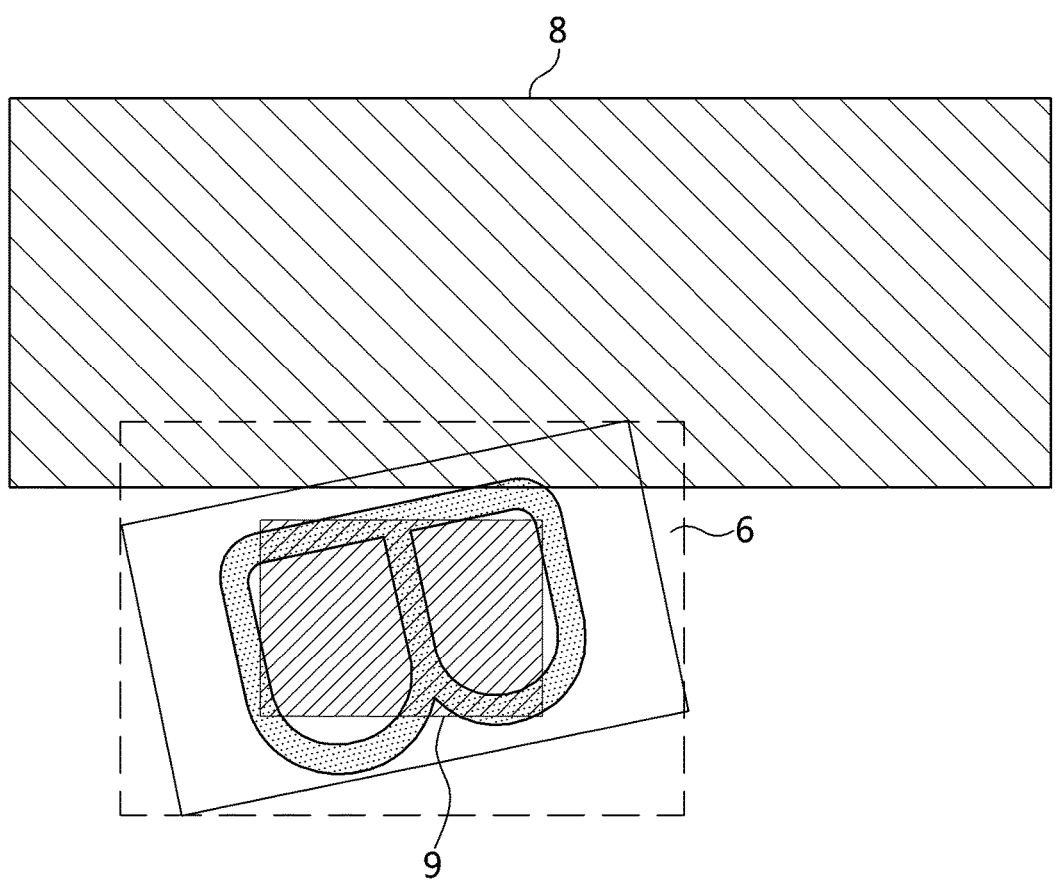

FIGS. 7 and 8 illustrate that the case where the document file includes letters is specially handled.

When the document file corresponds to a letter attribute as described above, the security determination unit 1350 may determine security based on whether a region in which a letter reduced in a ratio set by a user or in a predetermined ratio is present corresponds to a confidential region.

Although a very small part of a region in which a letter is present is included in a confidential region, a person may not commonly identify the letter using only the very small part because of the characteristics of the letter. Accordingly, the region in which the letter is present may be reduced in a ratio set by a user or in a predetermined ratio, and the reduced region may be configured not to be copied only when it is included in the confidential region.

More specifically, referring to FIG. 7, the letter "A" includes a reduced region 9 that has been reduced in a ratio set by a user or in a predetermined ratio based on a bounding box 6.

In this case, only when the reduced region corresponds to a confidential region 8 is the reduced region not copied to an editing space file. That is, upon determining security, the security determination unit 1350 determines that security is problematic only when the reduced region is included in the confidential region 8.

In contrast, referring to FIG. 8, in the case of the letter "B", a reduced region 9 that has been reduced in a ratio set by a user or in a predetermined ratio based on a bounding box 6 is not included in a confidential region 8. Accordingly, although some region of the letter "B" is included in the confidential region 8, the security determination unit 1350 determines that security is not problematic.

FIGS. 9 to 12 illustrate a process in which the data deletion unit 1371 deletes data and a process in which the effect processing unit 1372 applies an effect to a deleted region.

Figure 9:
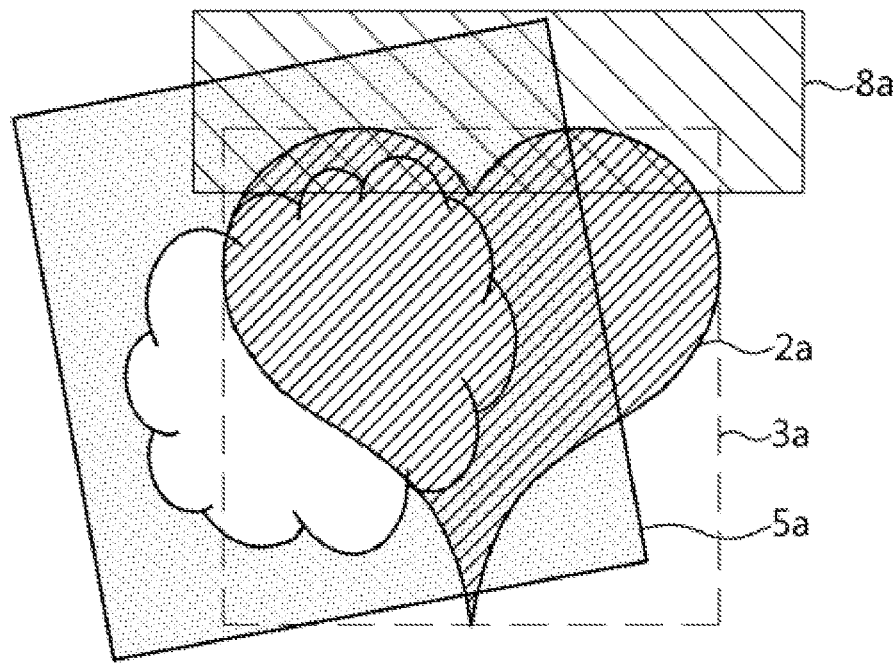

Referring to FIG. 9, an image box 5a corresponding to page coordinates, that is, coordinates based on a page, is present. Likewise, a clipping line 2a and a bounding box 3a corresponding to the page coordinates are present.

Furthermore, a confidential region 8a corresponding to the page coordinates is present.

Figure 10:
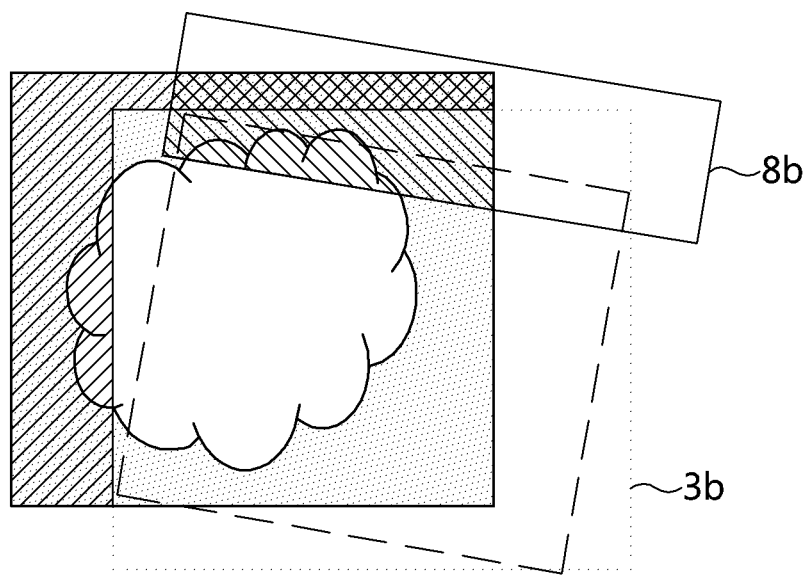

From FIG. 10, it can be seen that all the elements illustrated in FIG. 9 are converted into image coordinates, that is, the coordinates based on an image.

That is, as described above, the bounding box computation unit 1371a computes the minimum square-shaped bounding box 3a including a clipping line, that is, the boundary line of a clipping mask. The coordinate system conversion unit 1371b converts a page coordinate system, that is, a coordinate system based on a page of the document file, into an image coordinate system, that is, a coordinate system based on an image present in the document file.

For example, the confidential region 8a based on a page coordinate system in FIG. 9 is converted into a confidential region 8b based on an image coordinate system in FIG. 10. Furthermore, the bounding box 3a based on a page coordinate system in FIG. 9, is also converted into a bounding box 3b based on an image coordinate system in FIG. 10.

The reason why the coordinates based on the page coordinate system are converted into those based on the image coordinate system as described above is to more precisely extract a region deleted by the data deletion unit 1371.

Figure 11:
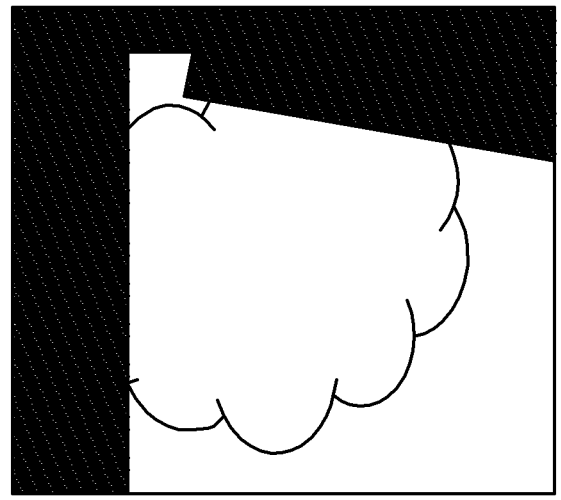

Referring to FIGS. 10 and 11, as a result, assuming that an image coordinate system is used, data corresponding to regions outside the confidential region 8b and the bounding box 3b may be deleted from an image. For example, in the case of an image, pixels corresponding to the regions outside the confidential region 8b and the bounding box 3b are deleted.

In this case, the effect processing unit 1372 may perform shading processing (e.g., in black) on the deleted regions.

Figure 12:
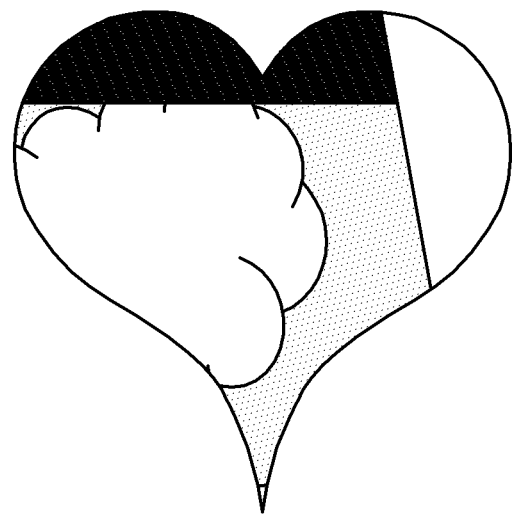

As a result, referring to FIG. 12, after data has been deleted and shading processing has been performed as described above, conversion into a page coordinate system may be performed again, and heart-shaped data may be edited and then copied to the editing space file.

Examples in which the apparatus and method for editing a document according to embodiments of the present invention are executed when they are implemented in a terminal in the form of applications are described below.

FIGS. 13 to 37 are diagrams illustrating examples in which a document is opened, scrapped, stored, and edited using the apparatus and method for editing a document according to embodiments of the present invention.

Figure 13:
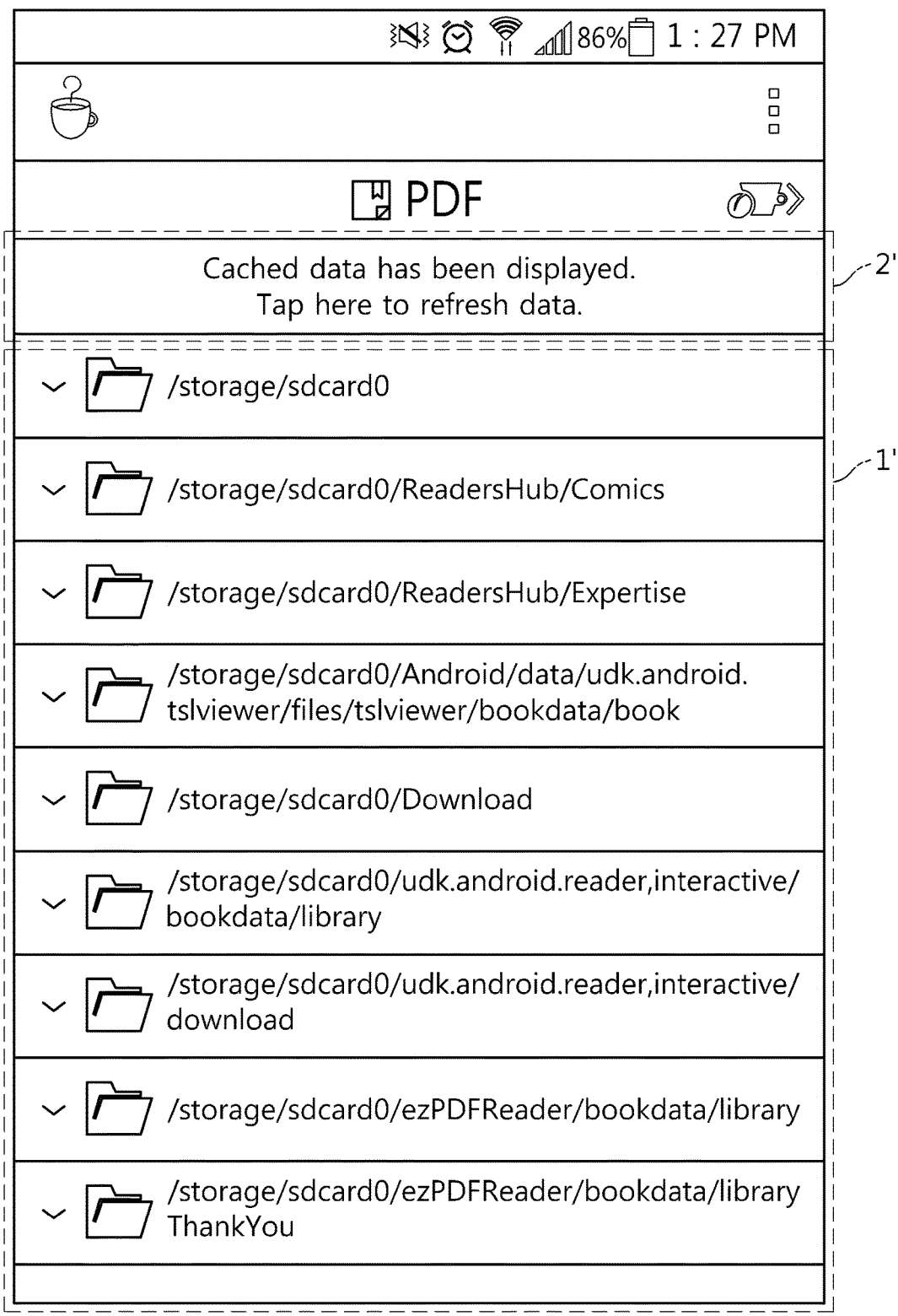
FIGS. 13 to 37 are diagrams illustrating examples in which a document is opened, scrapped, stored, and edited using the apparatus and method for editing a document according to embodiments of the present invention.

Referring to FIG. 13, a folder list 1' that contains document files stored in a terminal has been visualized on the display unit of the terminal. Furthermore, a refresh tap 2' that may be used when the folder list is refreshed is also visualized on the display unit.

Figure 14:
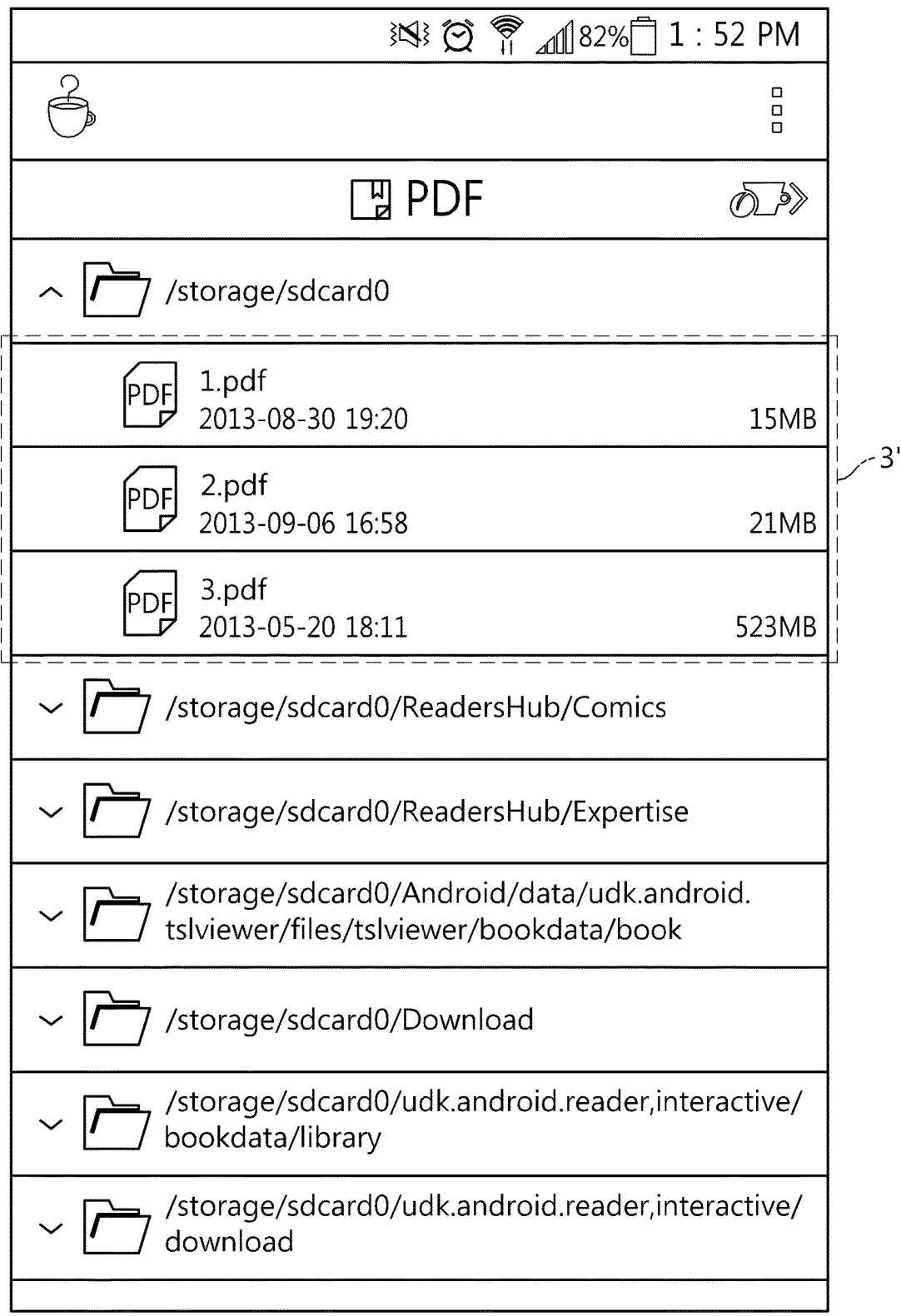

An example in which a specific folder is selected from the folder list 1' of FIG. 13 and a PDF document file list 3' stored in the specific folder is displayed is illustrated in FIG. 14. The user of the terminal may select a specific PDF document file from the PDF document file list 3' of FIG. 14, and may open the selected PDF document file and then a function, such as the cut-out of an area of interest.

Figure 15:
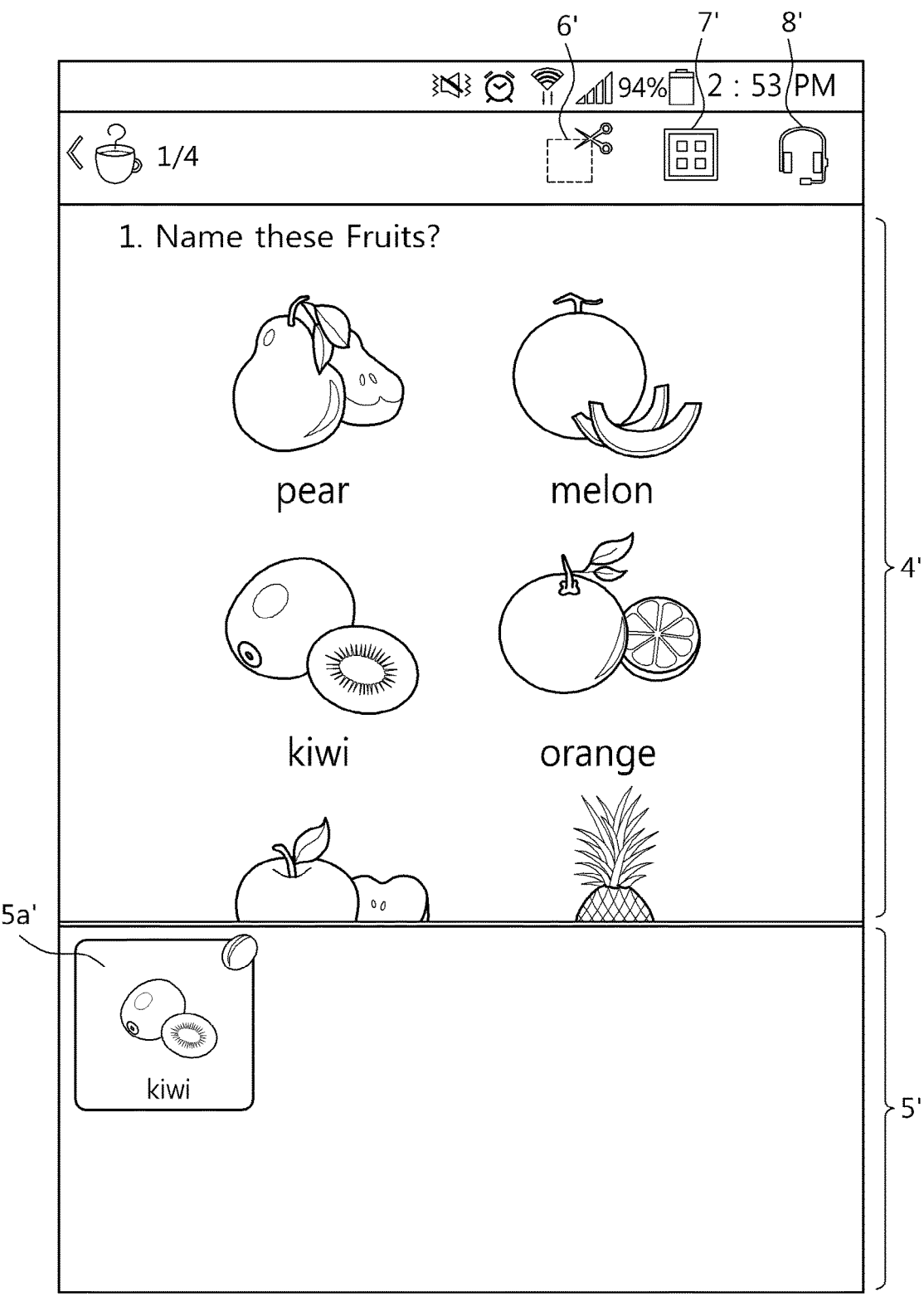

Furthermore, an example of a screen in the case where a specific PDF document file is selected in FIG. 14 is illustrated in FIG. 15. Referring to FIG. 15, a cut-out icon 6', a thumbnail icon 7', and a text-to-speech (TTS) icon 8' may be configured to be displayed on the upper part of the display screen. Furthermore, a document file display unit 4' on which an opened PDF document file is displayed may be configured in the middle part of the display screen. Furthermore, an area-of-interest storage unit 5' in which a cut-out area of interest 5a' is stored may be configured on the lower part of the display screen. That is, the opened PDF document file and the area-of-interest storage unit 5' may be displayed on a single display screen.

Figure 16:
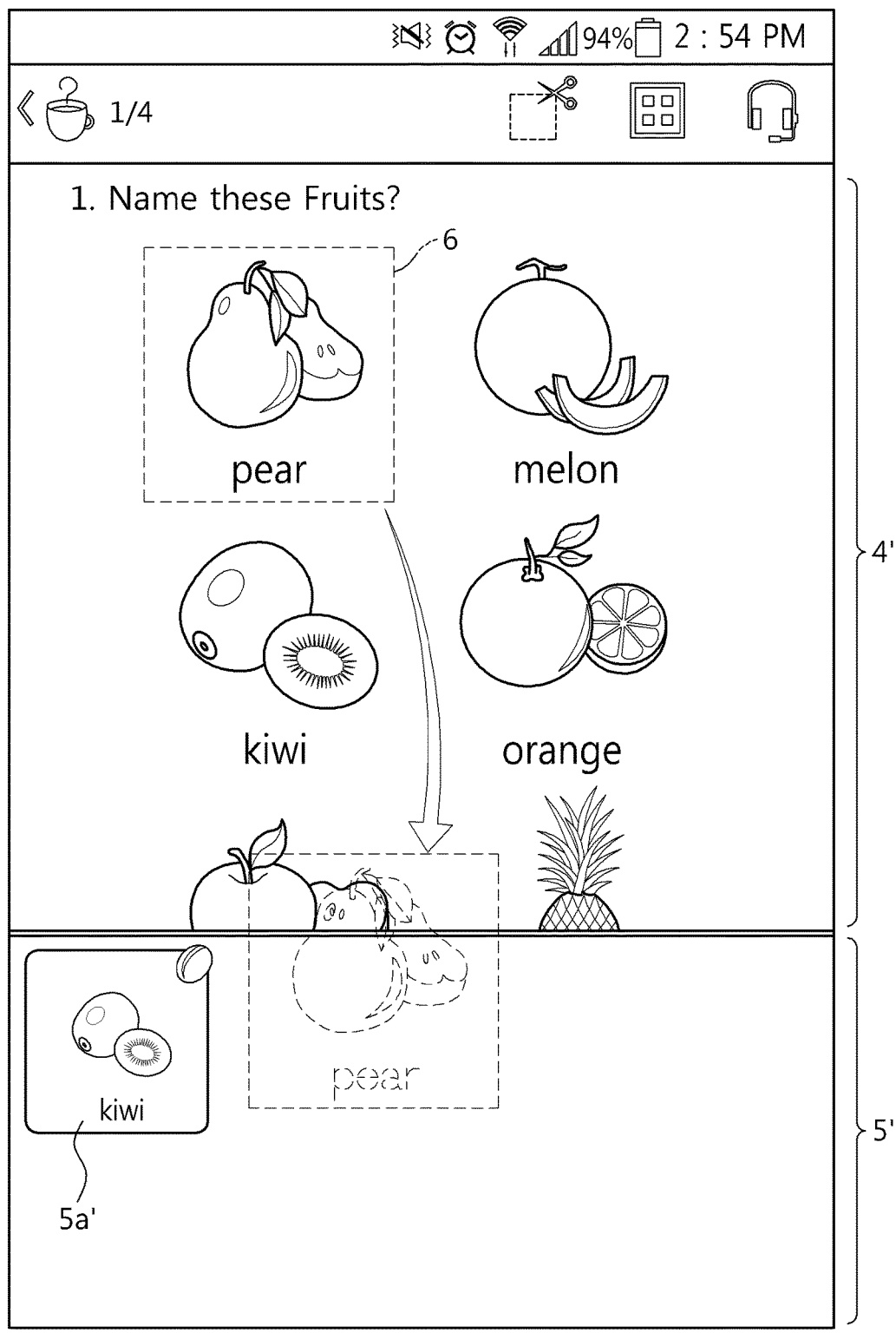

FIG. 16 illustrates an example in which an area of interest 6' is specified in the document file opened in the document file display unit 4' and is moved to the area-of-interest storage unit 5'. In this case, the specification and movement of the area of interest 6' may be performed by a drag-and-drop operation on a touch display unit. In this case, prior to the specification of the area of interest, the cut-out icon at the upper part of the display screen may be selected.

Figure 17:
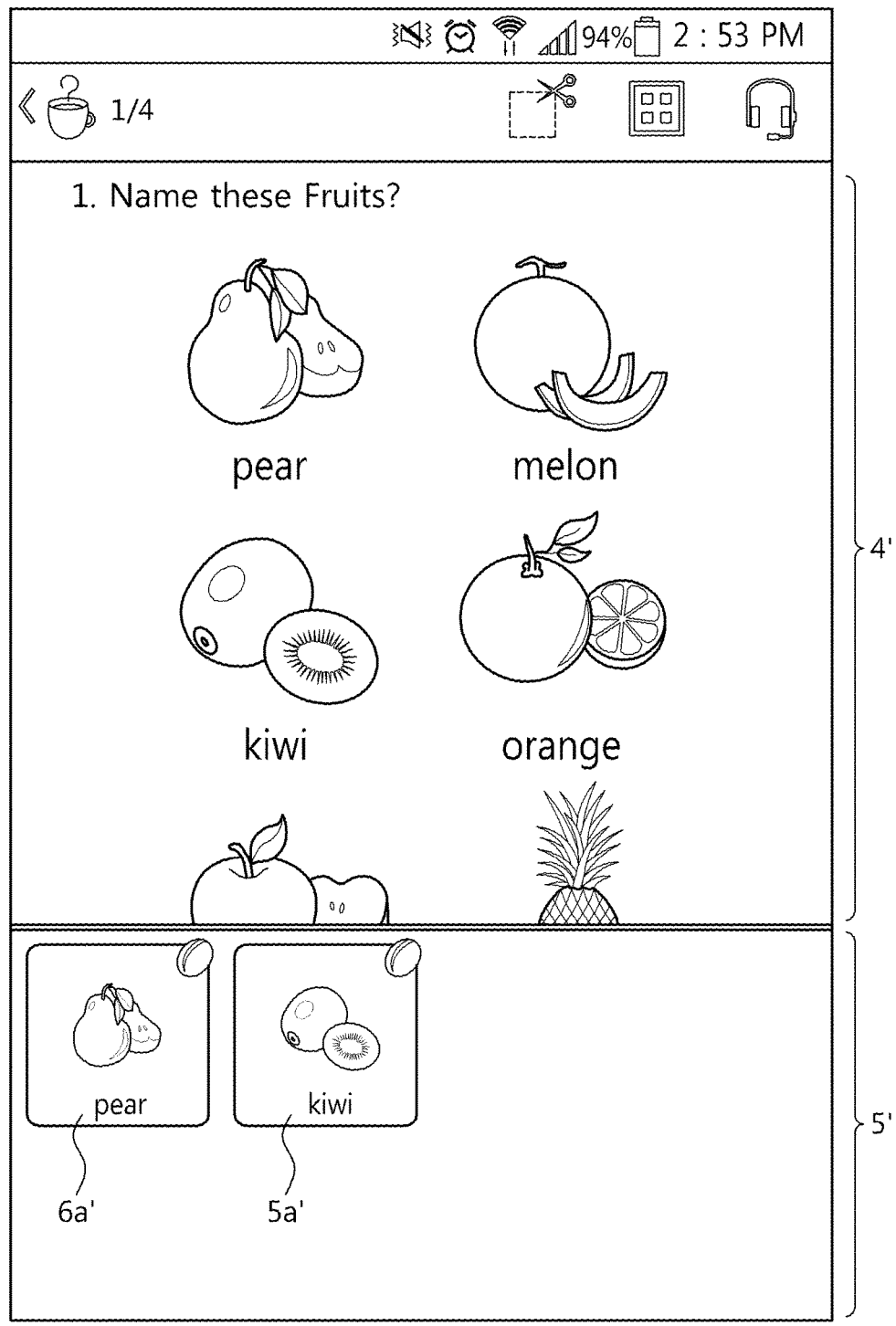

Furthermore, the area of interest 6' dropped to the area-of-interest storage unit 5' may be stored in a thumbnail form like a plurality of areas of interest 5a' and 6a' illustrated in FIG. 17.

Figure 18:
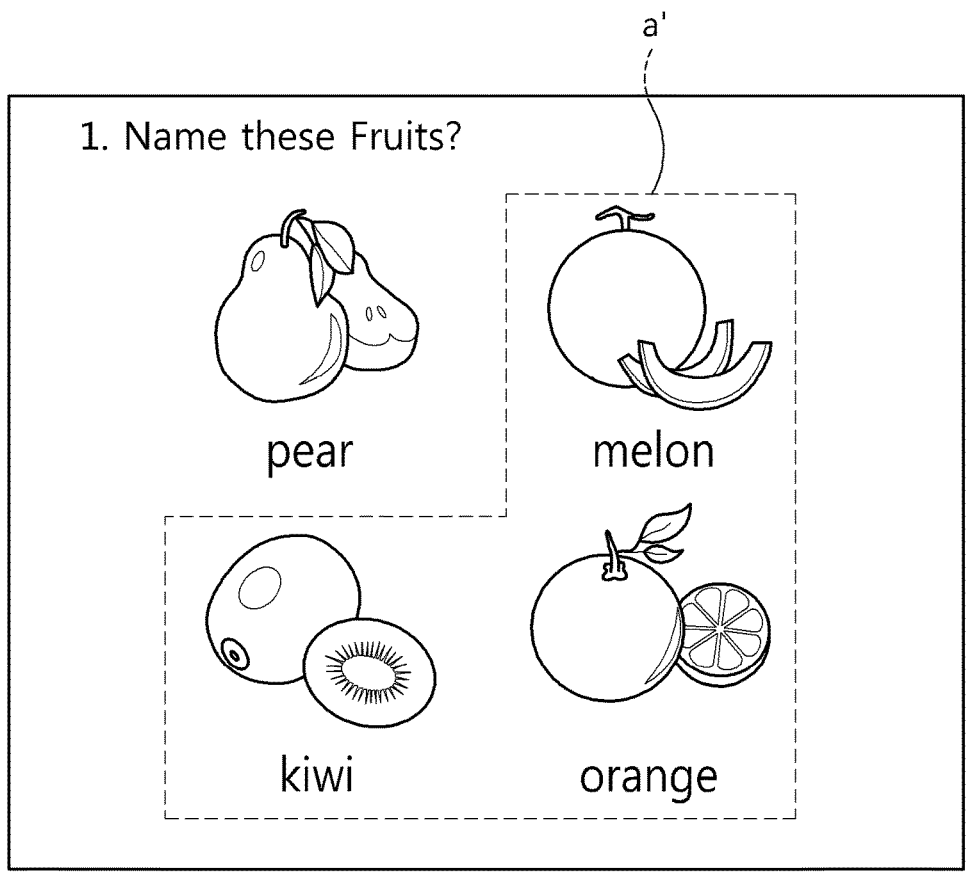
Figure 19:
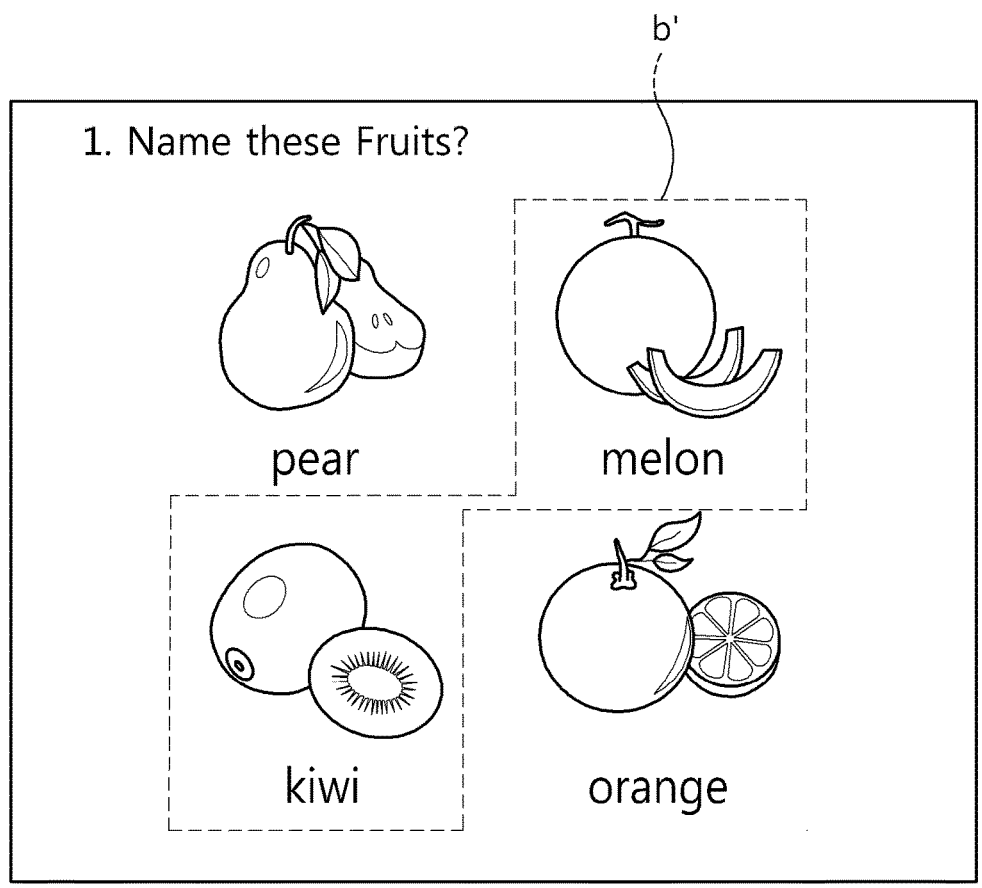
Figure 20:
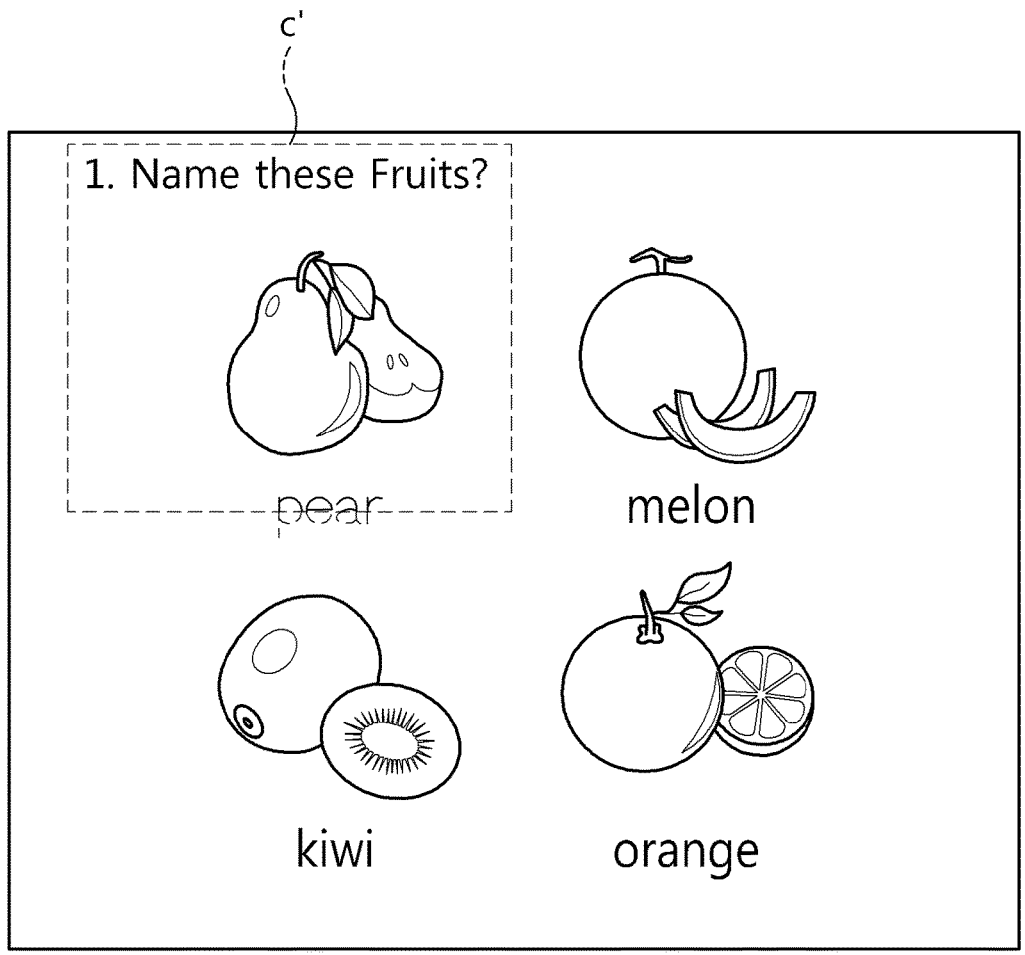

FIGS. 18 to 20 illustrate various examples in which areas of interest a', b', and c' are specified in an opened document file. The area of interest may have any form as long as it is configured in the form of a closed region.

Figure 21:
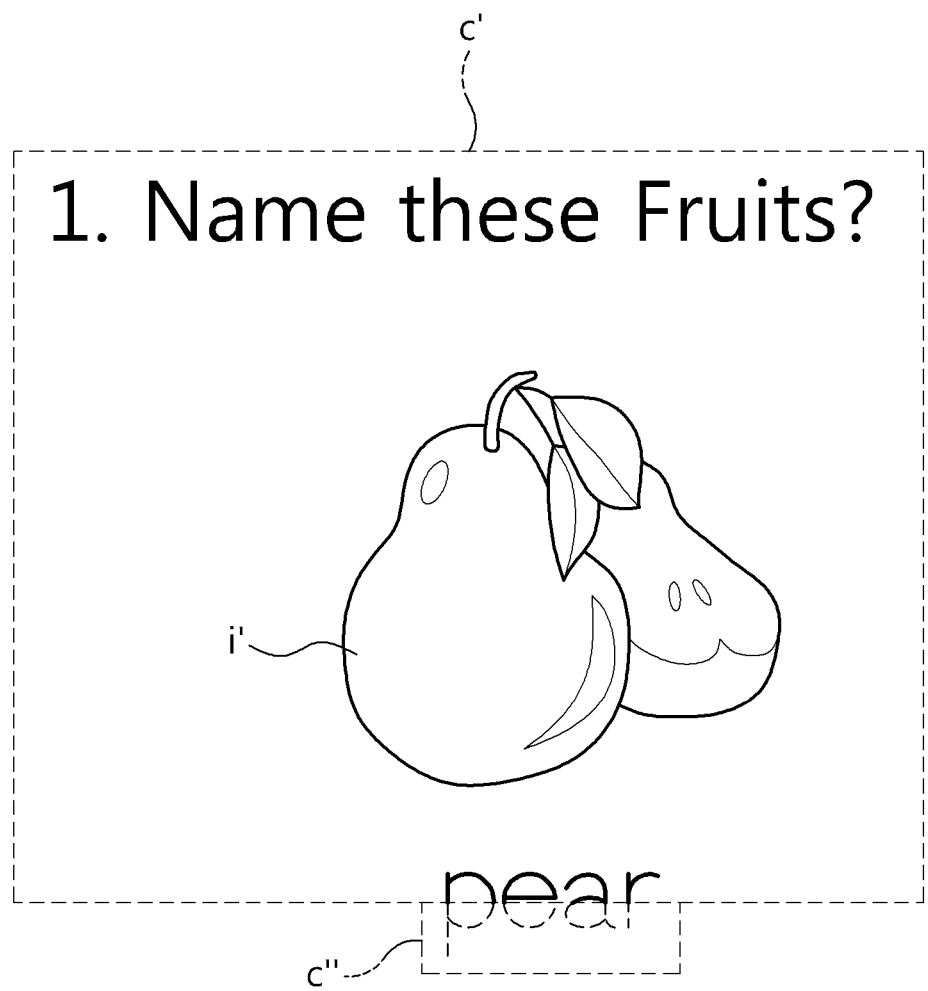

In this case, the area of interest is cut out on a per-entity (letter, image, or moving image) basis. That is, referring to FIGS. 20 and 21, if an area of interest c' is specified in the state in which parts of letters have been cut out, as illustrated in FIG. 20, the area of interest including all the attributes of the cut-out letters is cut out. However, control may be performed so that a letter part c'' outside the area of interest is hidden, as illustrated in FIG. 21, and only the internal region of the selected area of interest c' is visualized to a user. Since the area of interest is cut out on a per-entity basis in the state in which the attributes of an entity have been maintained as described above, all letters may be selected when only cut-out letters are subsequently selected in the area of interest c' and an editing task, such as copying, may be performed.

Figure 22:
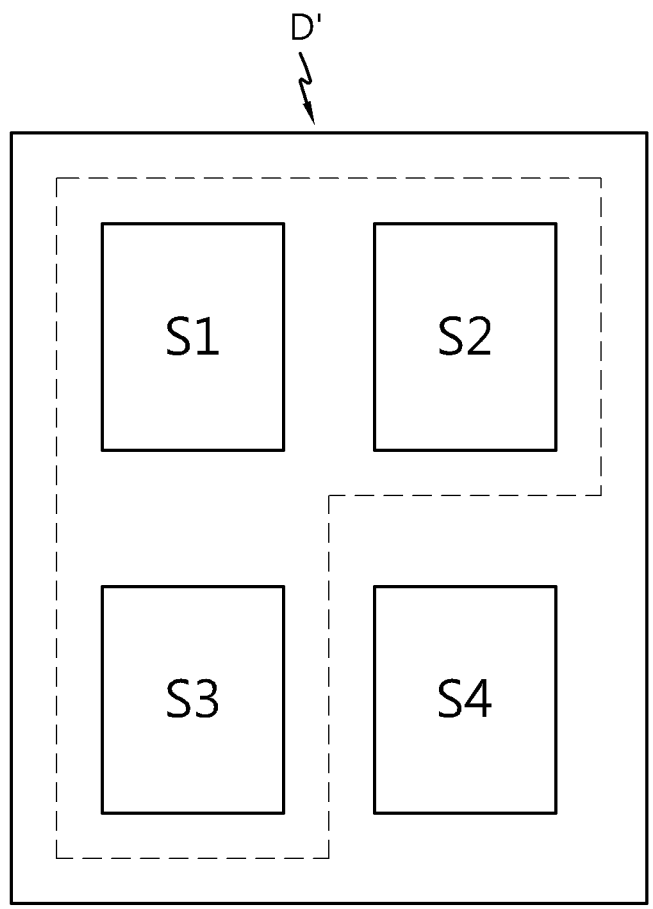
Figure 23:
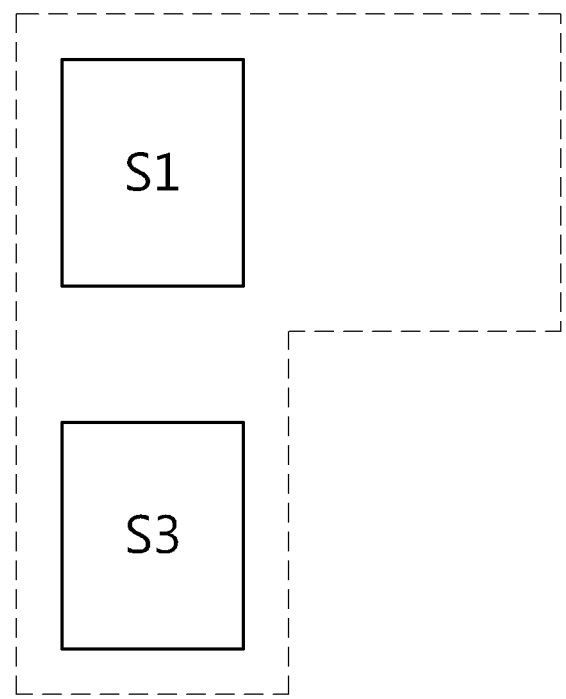

FIG. 22 illustrates an example of a document file including entities S1 to S4. It is assumed that the entity S2 is a predetermined confidential region and the entities S1, S3, and S4 are non-confidential regions. Furthermore, if a region indicated by a dotted line in the document file of FIG. 22 is specified as an area of interest, only the entities S1 and S3 excluding the entity S2 corresponding to the confidential region are cut out in the cut-out area of interest and then visualized to a user, as illustrated in FIG. 23. Accordingly, document security can be improved.

Figure 24:
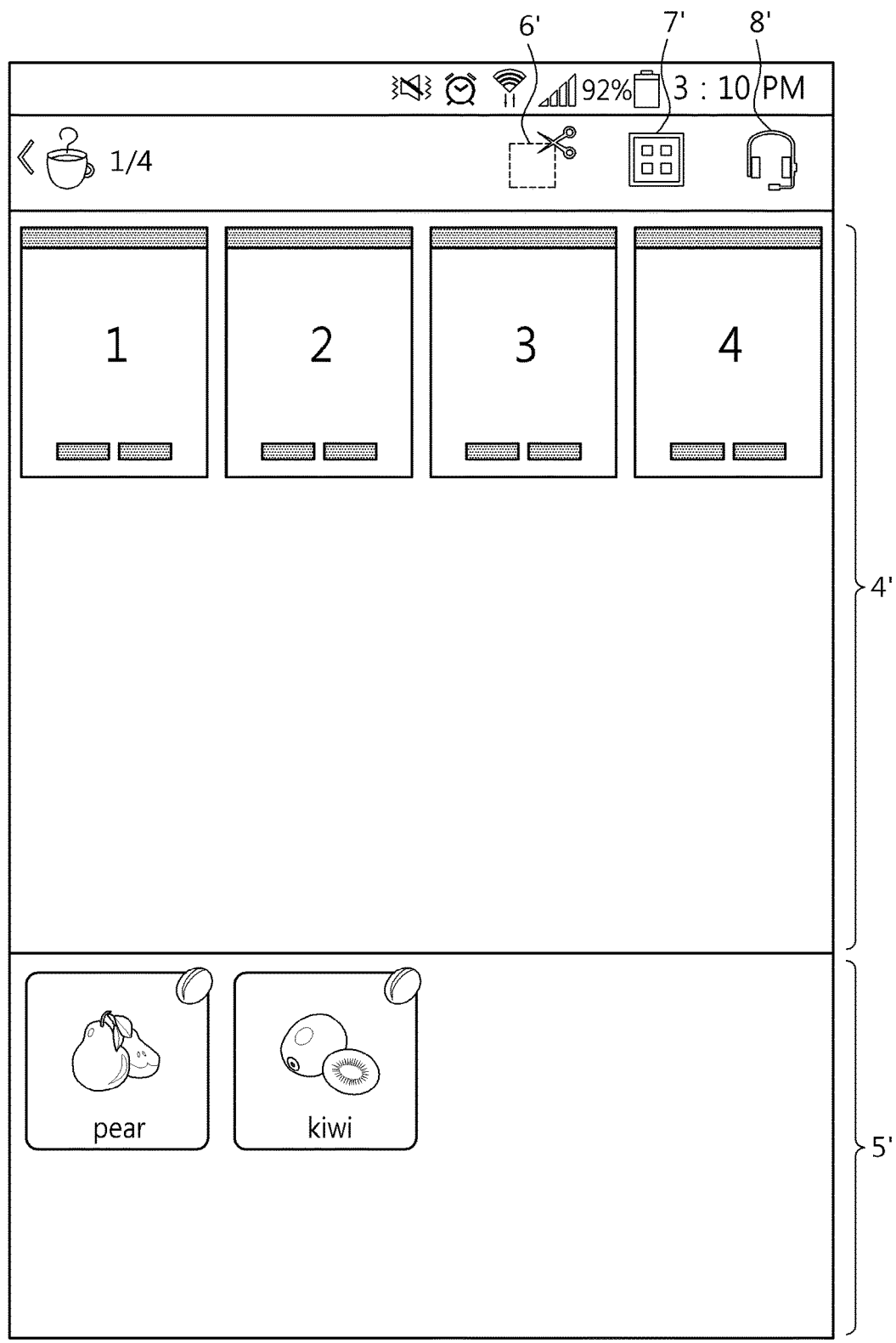

FIG. 24 illustrates an example in which a thumbnail icon 7' on the upper part of a display screen is selected and a plurality of pages including an opened document file is displayed on a document file display unit 4' in a thumbnail form.

Figure 25:
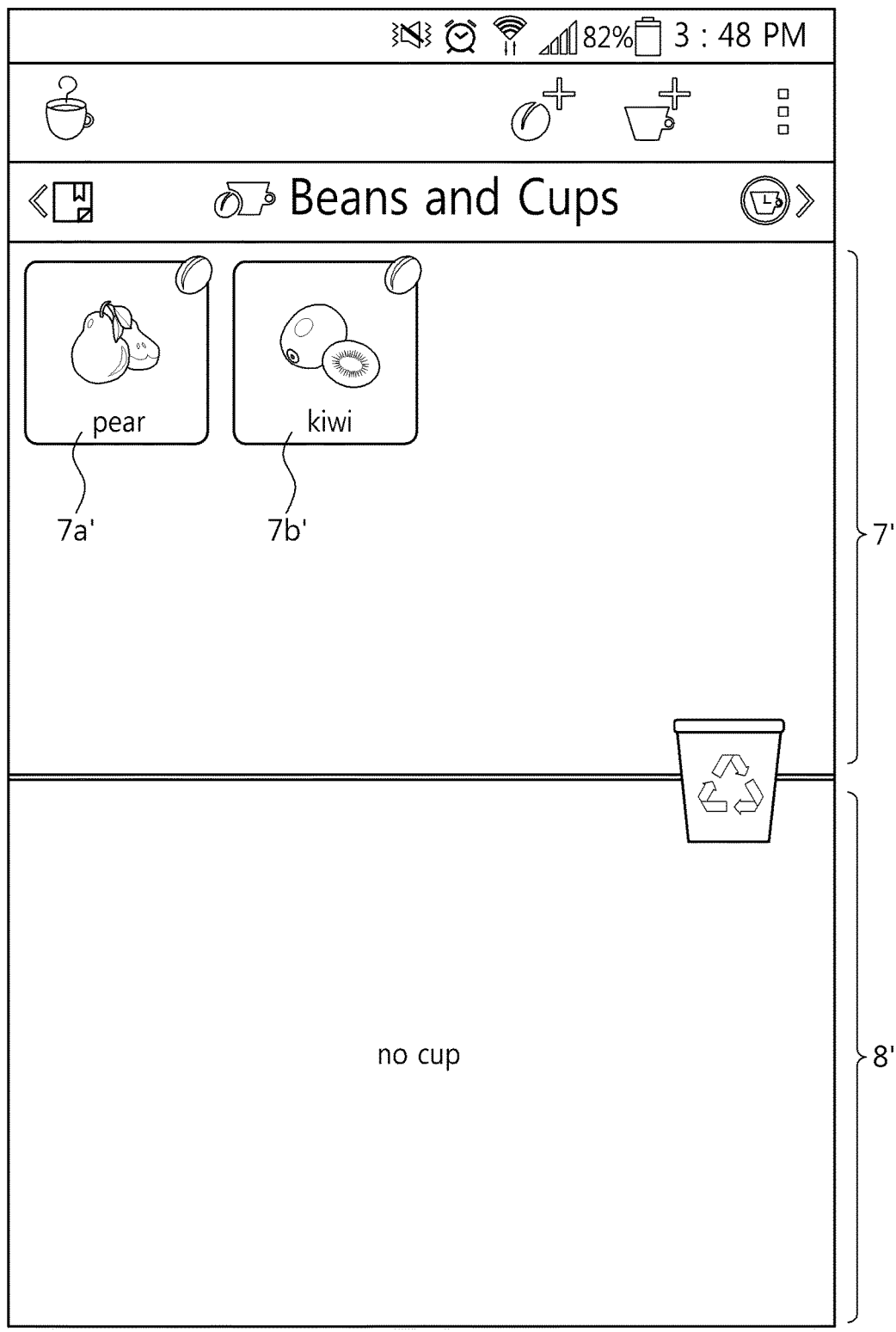
Figure 26:
Figure 27:
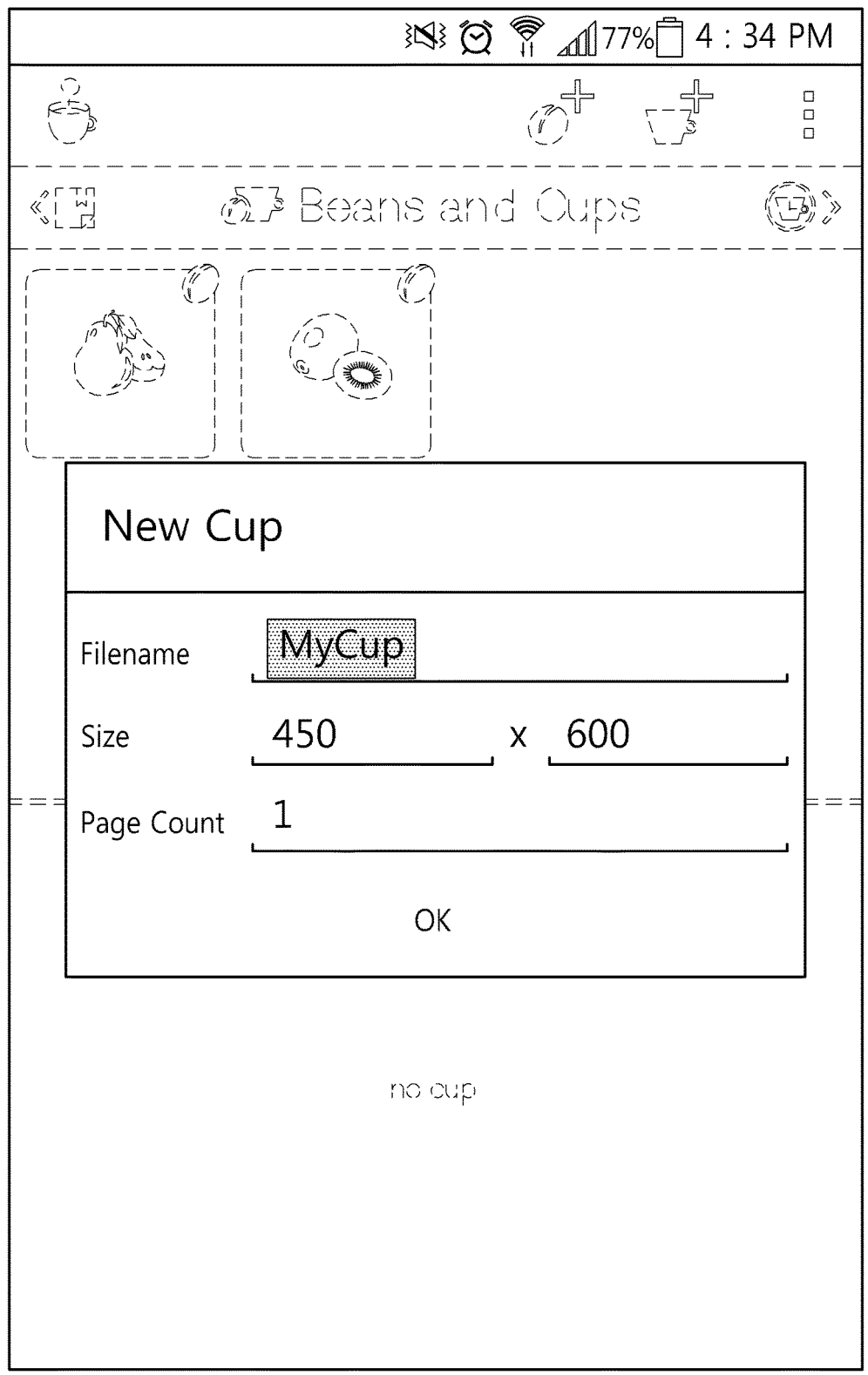
Figure 28:
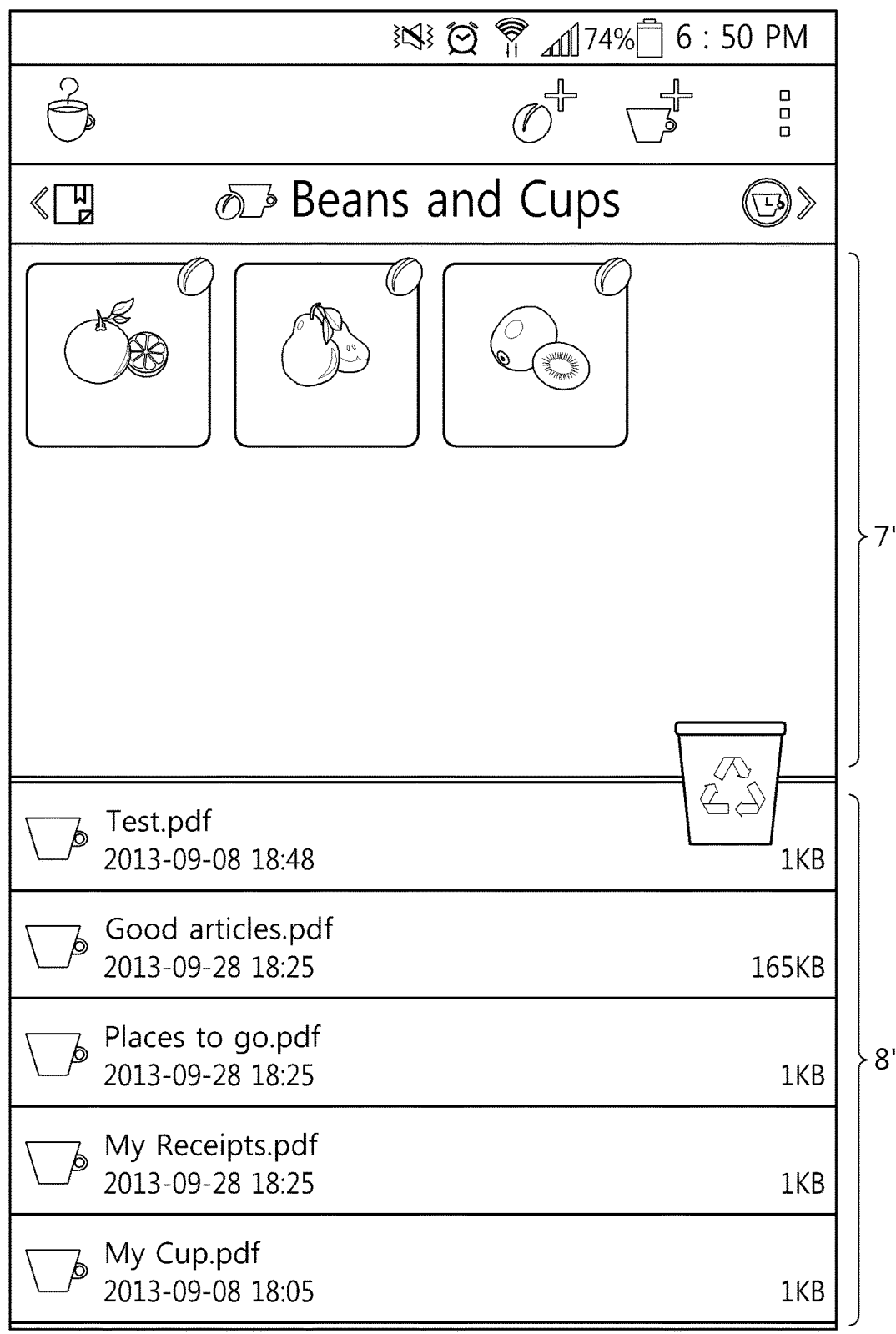

FIG. 25 illustrates an example in which an area-of-interest display unit 7' on which a plurality of areas of interest 7a' and 7b' specified and stored by a user is displayed and an edited document display unit 8' on which a document file, that is, the subject of editing, is displayed are displayed on a display screen. In this case, the area-of-interest display unit 7' may be configured to have the same attributes as an area-of-interest storage unit 5' of FIG. 24. An example in which a specific area of interest (e.g., 7a') of the areas of interest 7a' and 7b' displayed on the area-of-interest display unit 7' is selected and enlarged is illustrated in FIG. 26. Furthermore, an example in which a PDF document file, that is, an editing target, is created in the edited document display unit 8' is illustrated in FIG. 27. As described above, a PDF document file in an empty document format may be added to the edited document display unit 8' in response to a user selection, and an existing stored PDF document file may also be displayed on the edited document display unit 8'. FIG. 28 illustrated an example in which a variety of types of PDF document files, that is, an editing target, are displayed on the edited document display unit 8'. Each of the PDF document files displayed on the edited document display unit 8' may have stored areas of interest classified and collected according to specific subjects in response to a user selection.

Figure 29:
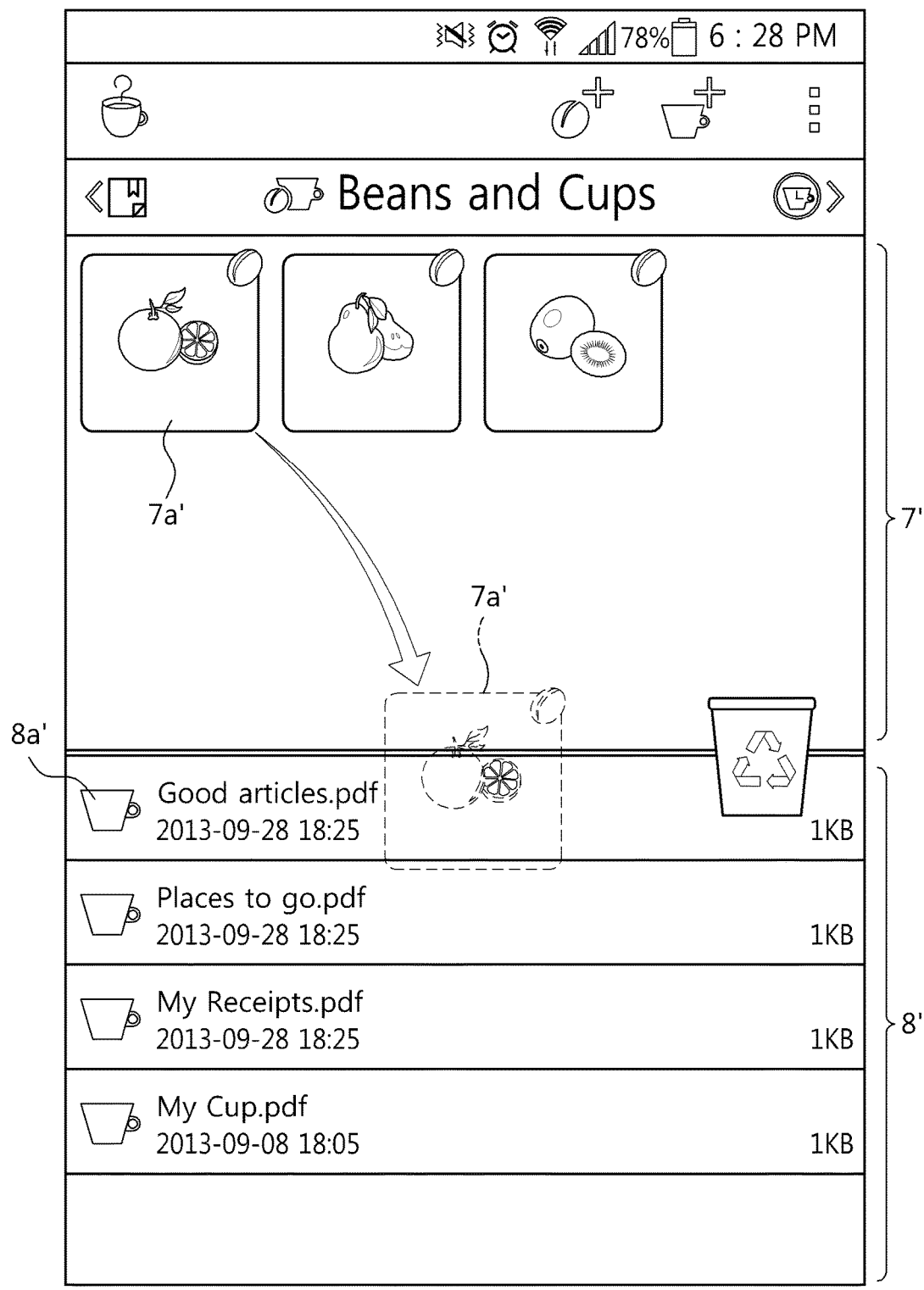

FIG. 29 illustrates an example of an operation of including a specific area of interest 7a' in a specific document file 8a' by moving the specific area of interest 7a' to the specific document file 8a'. In this case, the specific area of interest 7a' may be included in the specific document file 8a' using a drag-and-drop method. Reference numeral 7a'' illustrates an example of the trajectory of the dragged and dropped specific area of interest 7a'.

Figure 30:
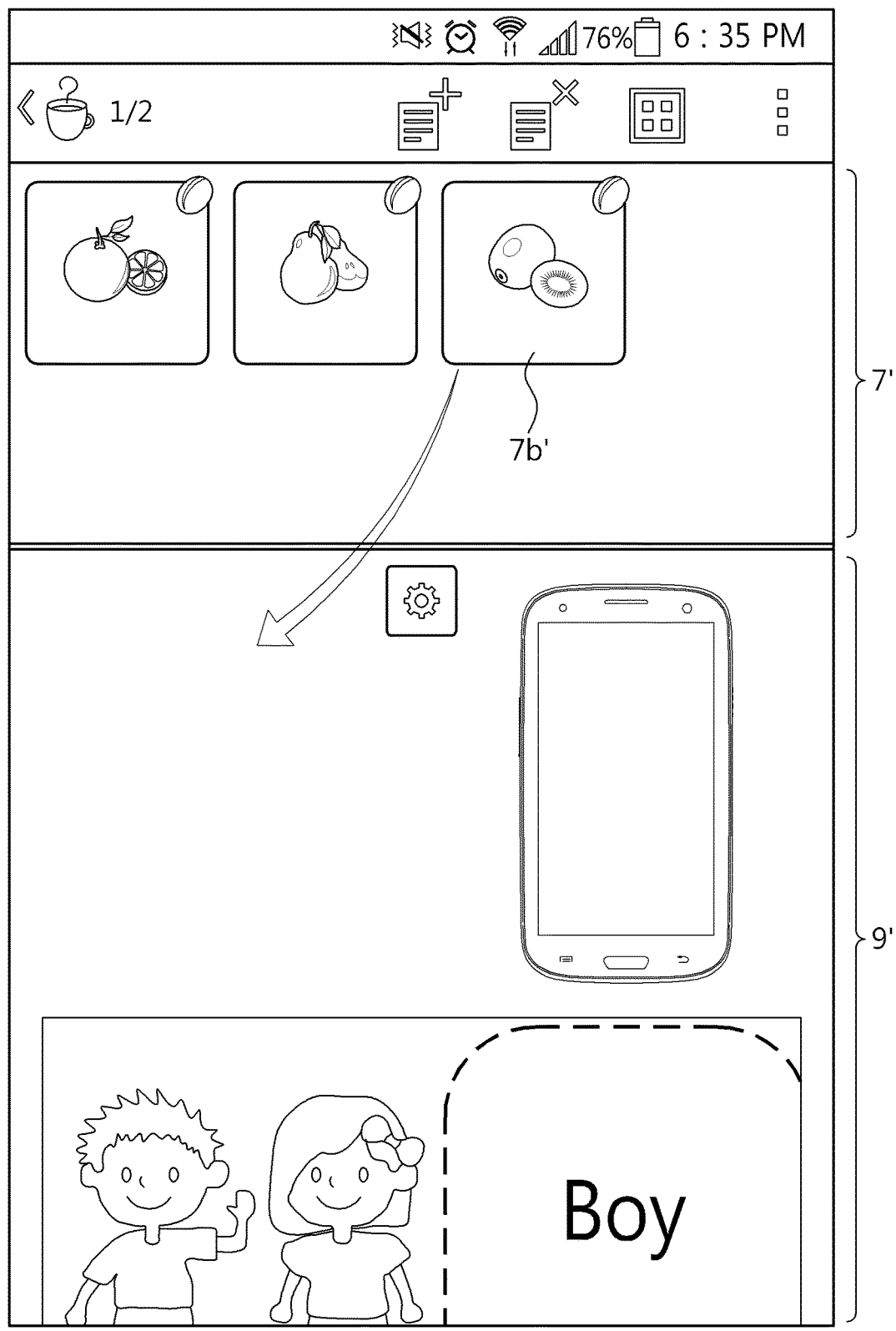
Figure 31:
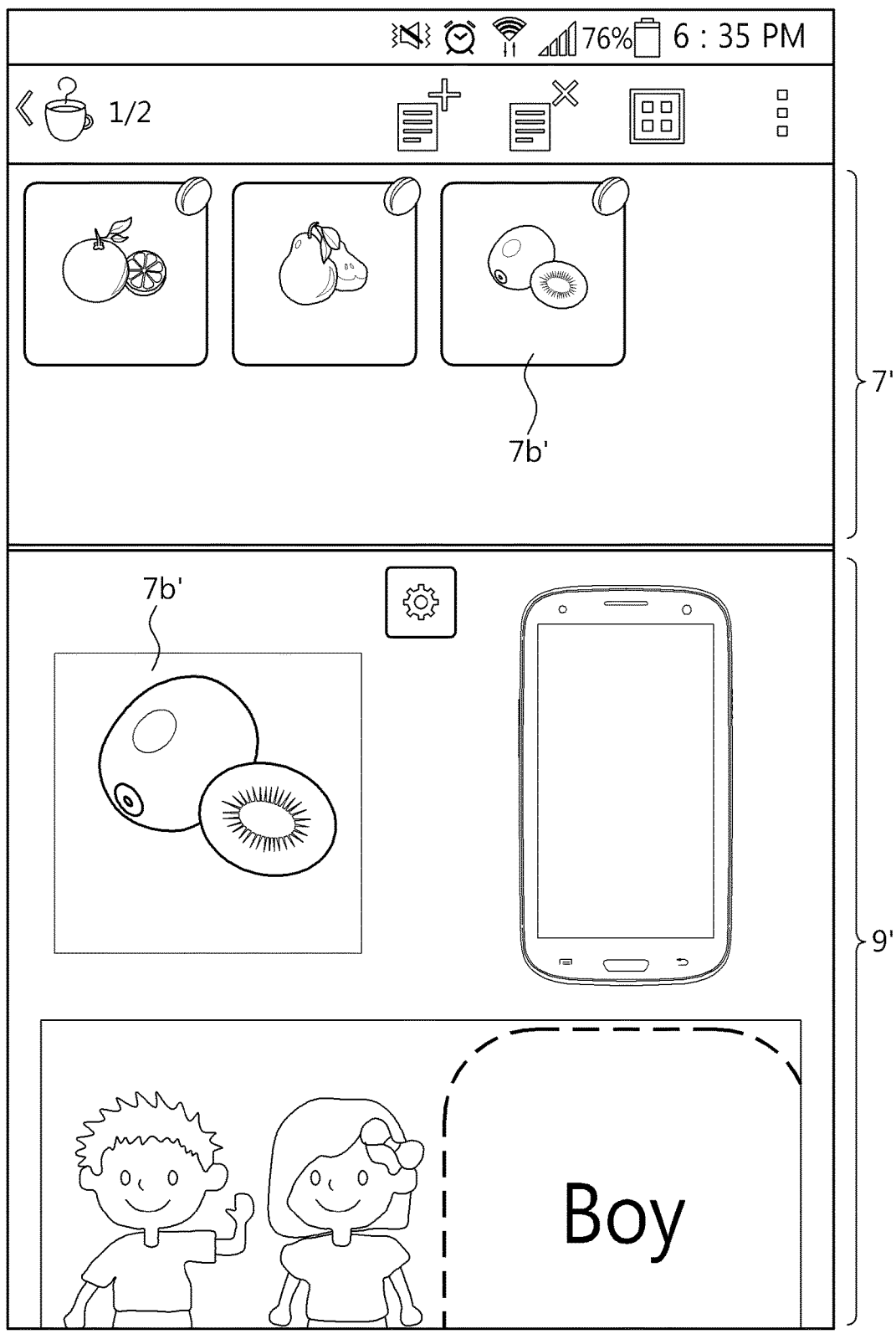

Furthermore, FIG. 30 illustrates an example in which a document file displayed on the edited document display unit 8' of FIG. 28 is opened in an edited document opening unit 9' by opening the document file. The edited document display unit 8' may be changed to the edited document opening unit 9' when the document file is opened, and then the edited document opening unit 9' may be displayed. Furthermore, both the edited document opening unit 9' and the area-of-interest display unit 7' may be displayed. Furthermore, as illustrated in FIGS. 30 and 31, a user may select the area of interest 7a' of the area-of-interest display unit 7', and may include the selected area of interest 7a' in an opened document file that is opened in the edited document opening unit 9'. Reference numeral 7b'' designates an example in which the area of interest 7b' has been included in the execution document file. Accordingly, the area of interest 7b' is included in the corresponding opened document and is then stored.

Figure 32:
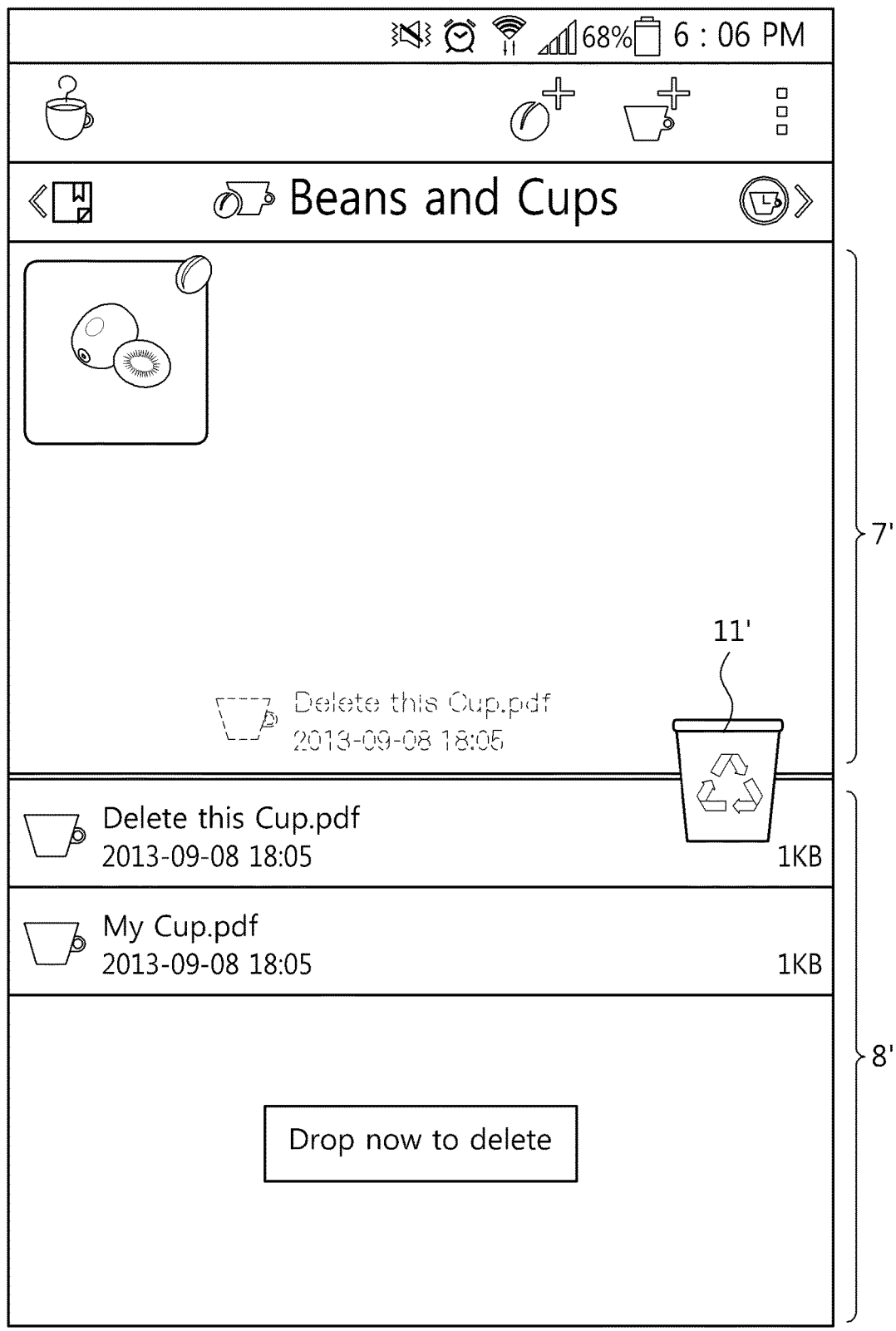
Figure 33:
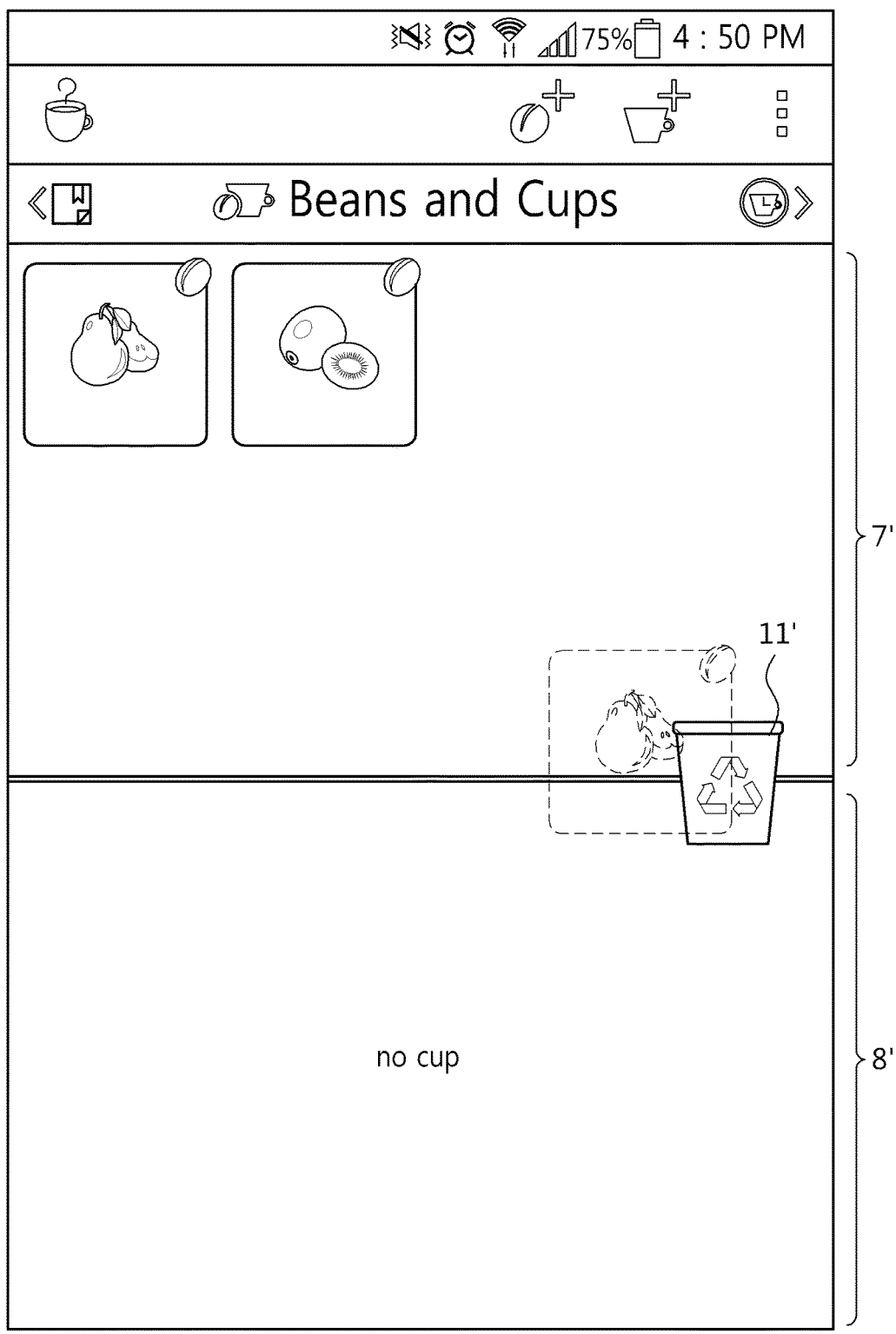

Furthermore, a wastebasket unit 11' may also be displayed on a display screen. As illustrated in FIGS. 32 and 33, an area of interest and an edited document displayed on the area-of-interest display unit 7' and the edited document display unit 8' may be deleted by moving the area of interest and the edited document to the wastebasket unit 11' using a drag-and-drop method.

Figure 34:
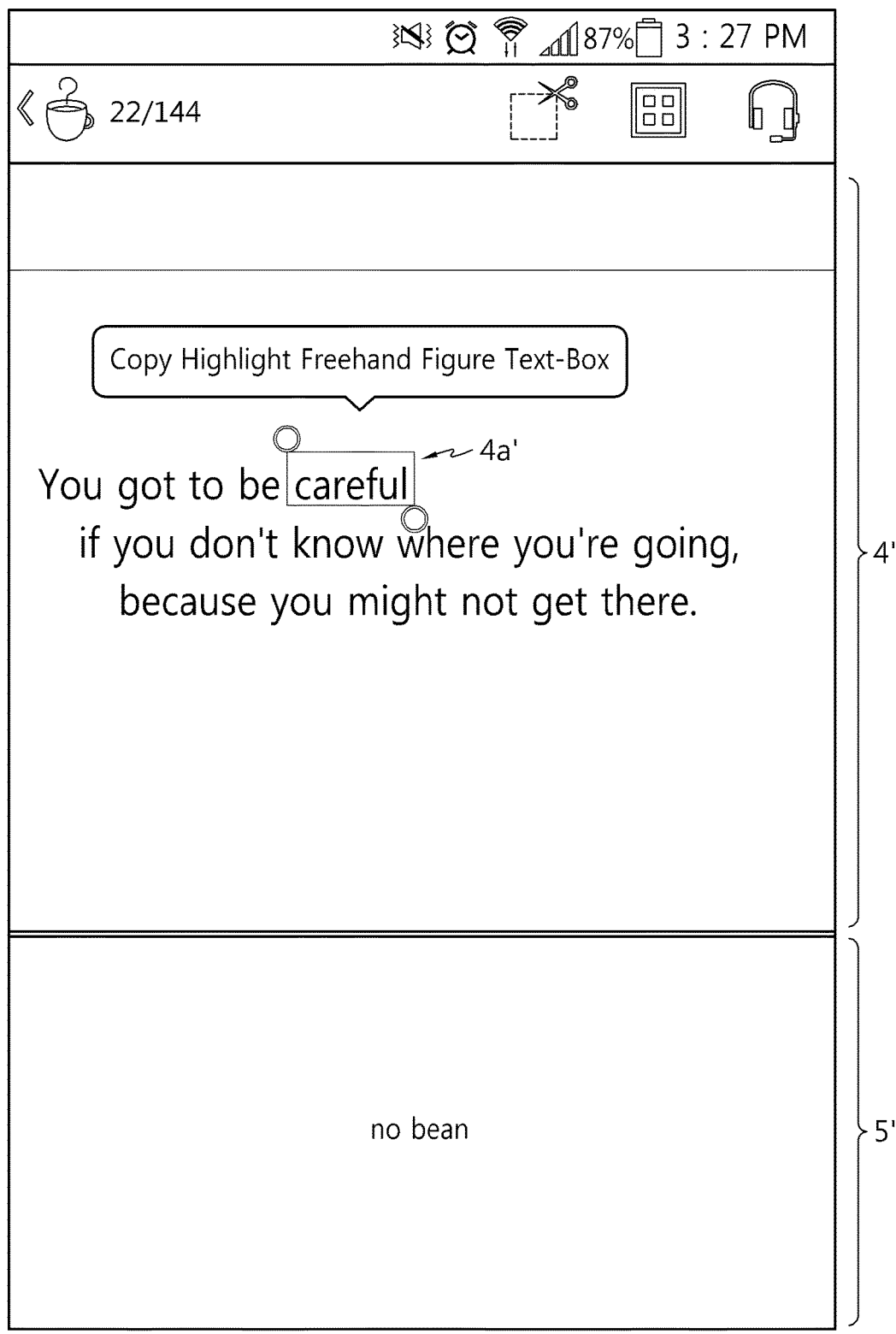
Figure 35:
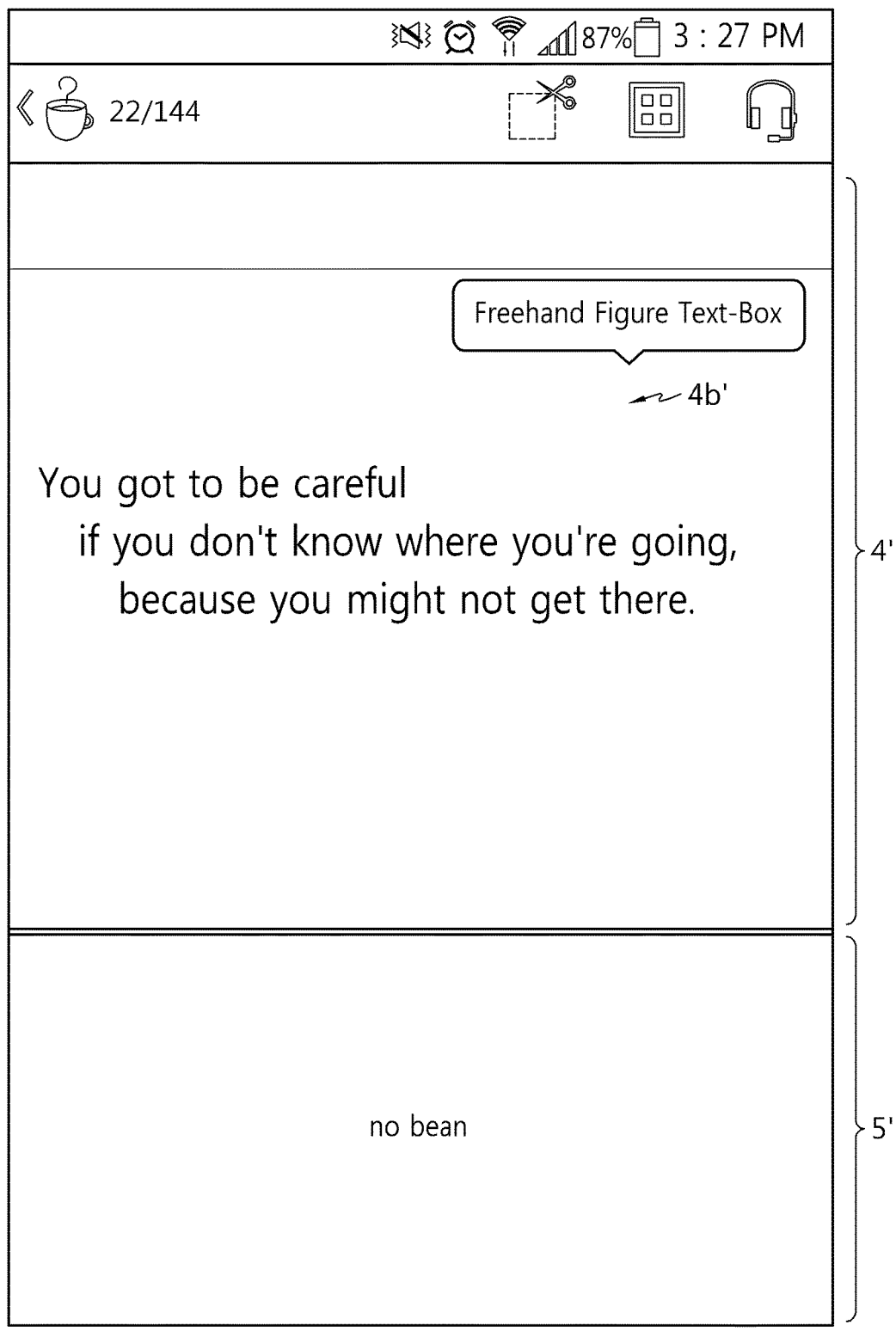

Referring to FIG. 34, an editing task, such as copying, may be performed on a letter part 4a' by selecting an entity of a PDF document file displayed on the document file display unit 4', that is, the letter part. In contrast, as illustrated in FIG. 35, when a blank region excluding the entity is selected, a task other than the editing of the entity may be selected.

Figure 36:
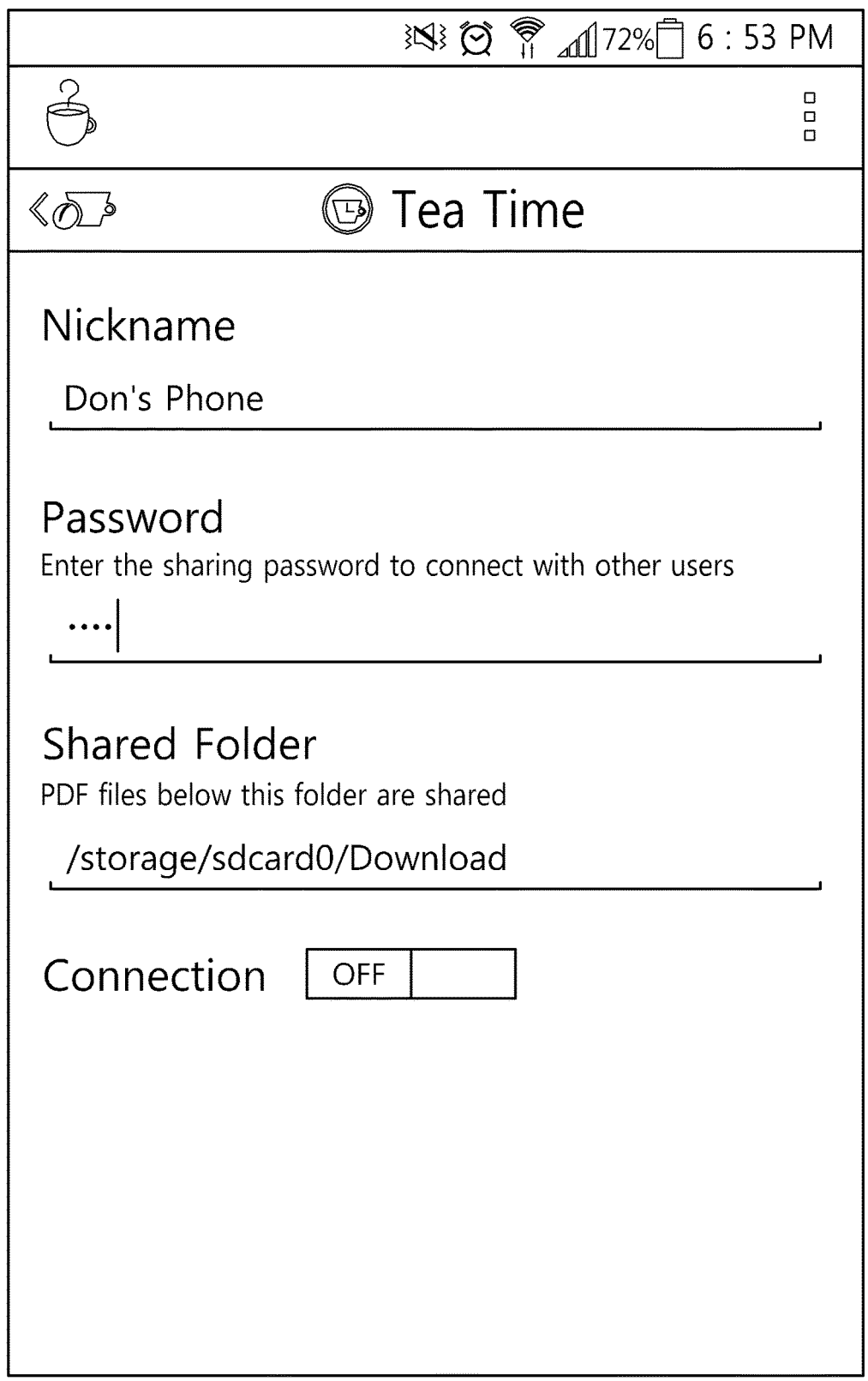
Figure 37:
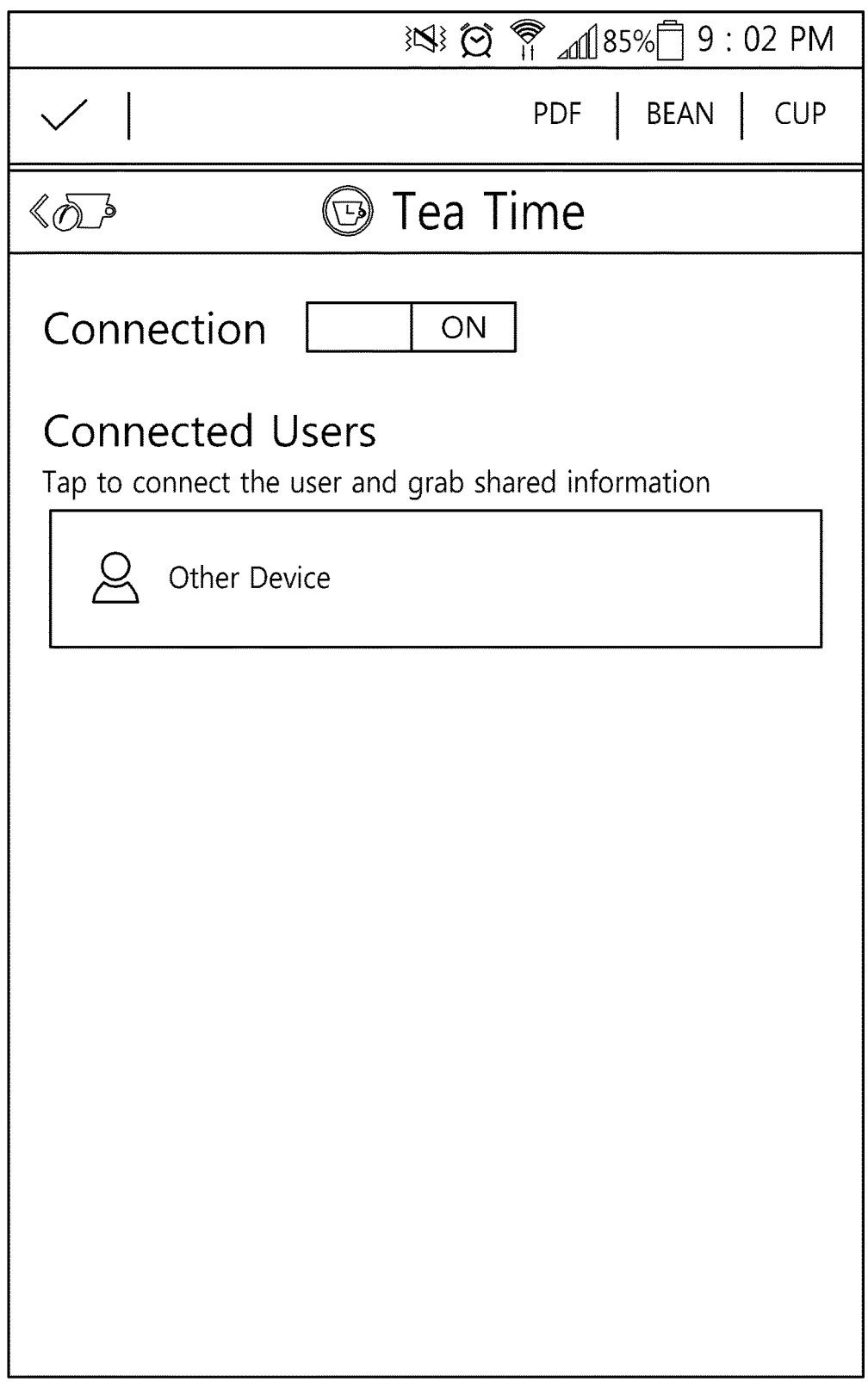

FIGS. 36 and 37 illustrate an example of a display screen on which a nickname, a password, and a sharing folder are set in order to access another terminal, that is, another apparatus for editing a document, and an example of a display screen on which a user to be accessed is selected.

A method of editing a document according to an embodiment of the present invention is described below.

Figure 38:
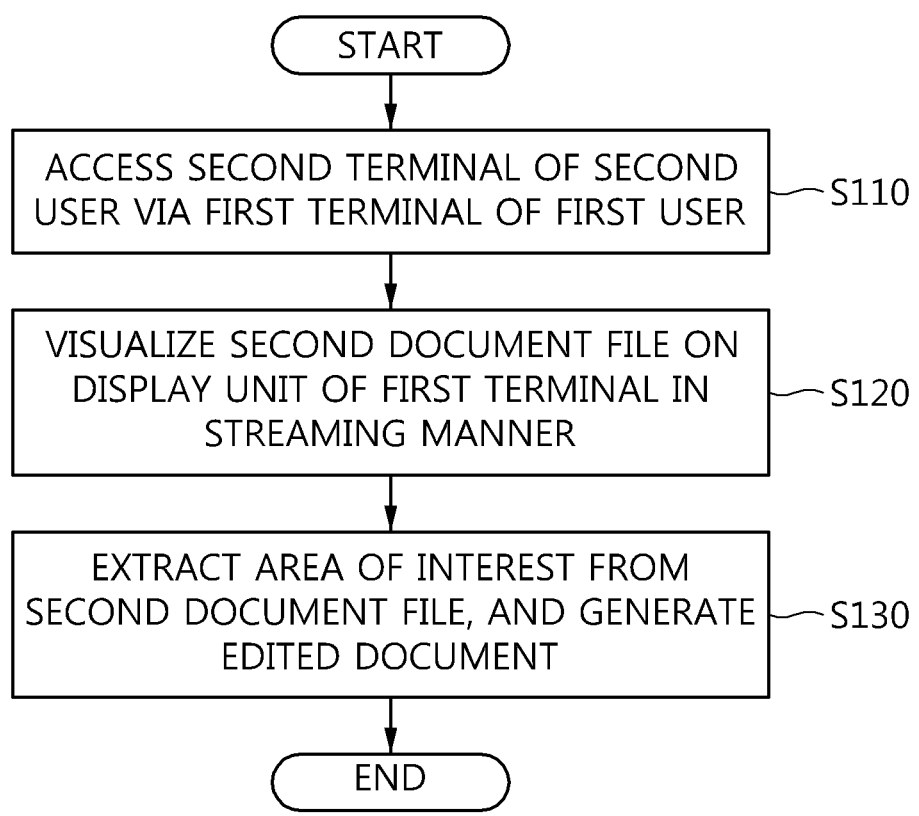
FIG. 38 is a flowchart illustrating a method of editing a document according to an embodiment of the present invention.

FIG. 38 is a flowchart illustrating a method of editing a document according to an embodiment of the present invention. Redundant descriptions that are identical to those of the apparatus for editing a document according to the embodiment of the present invention as described above are omitted.

Referring to FIG. 38, the method of editing a document according to an embodiment of the present invention includes accessing, by the streaming execution unit, the second terminal of a second user via the first terminal of a first user at step S110; visualizing, by the streaming execution unit, a second document file, which is a document file that is included in the predetermined sharing folder of the second terminal and has been selected by the first user in the first terminal, on the display unit of the first terminal in a streaming manner at step S120; and extracting, by the edited document generation unit, an area of interest from the second document file, which is visualized on the display unit of the first terminal in a streaming manner, in response to the manipulation of the first user, and generating edited document at step S130.

In this case, the document file may be a PDF file.

The case where the method of editing a document according to this embodiment of the present invention is applied among users is described below.

Figure 39:
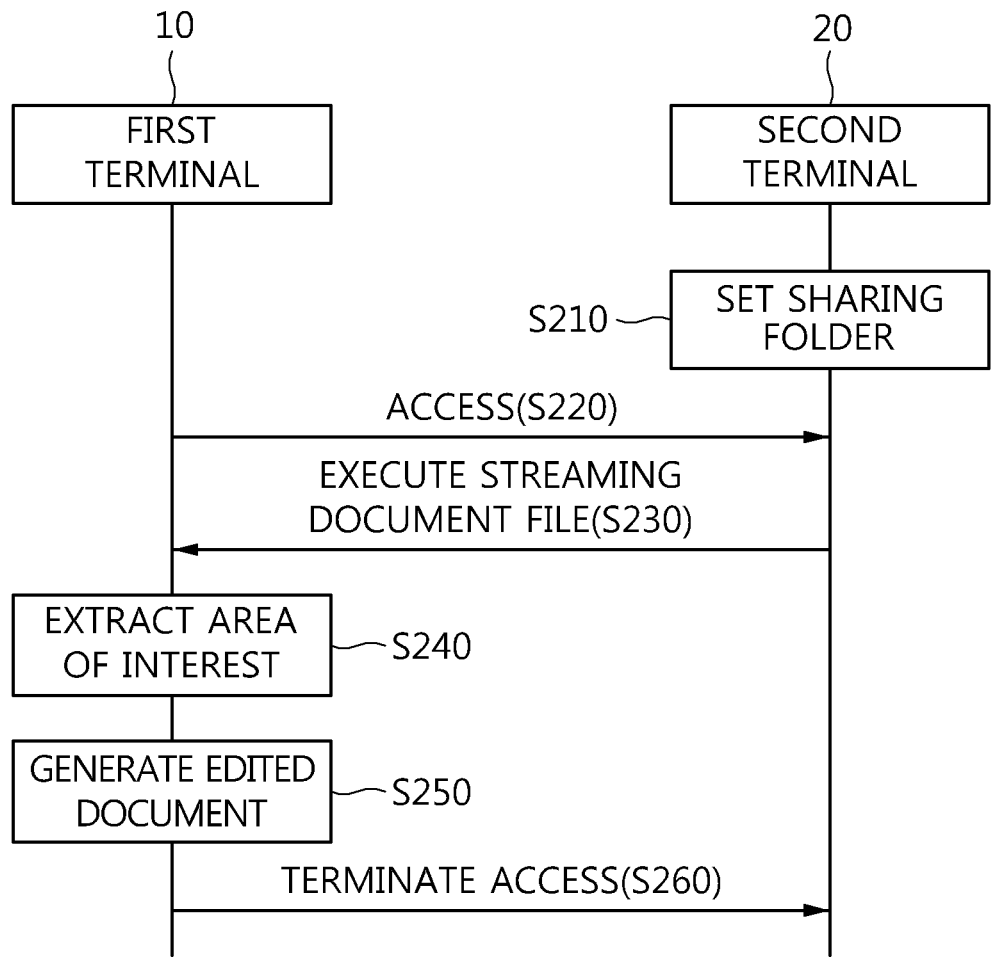
FIG. 39 is a flowchart illustrating a method of editing a document according to an embodiment of the present invention, which is performed among a plurality of users.

FIG. 39 is a flowchart illustrating a method of editing a document according to an embodiment of the present invention, which is performed among a plurality of users.

Referring to FIG. 39, in the method of editing a document according to this embodiment of the present invention, which is performed among a plurality of users, first, a sharing folder in which a document file to be shared with another user has been stored is set in the second terminal 20 at step S210.

Thereafter, the first terminal 10 accesses the sharing folder of the second terminal 20 at step S220. Thereafter, when the first terminal 10 executes a document file stored in the sharing folder of the second terminal 20, the document file is opened in the first terminal 10 in a streaming manner at step S230.

Furthermore, an area of interest is extracted from the document file in response to the manipulation of the user of the first terminal 10 at step S240. Furthermore, at step S250, an edited document is generated based on the area of interest extracted at step S240. Thereafter, when the access of the first terminal 10 to the second terminal 20 is terminated, the method of editing a document according to this embodiment of the present invention may be terminated at step S260.

The method of editing a document according to an embodiment of the present invention may be implemented may be implemented as a program that can be executed by various computer means. In this case, the program may be recorded on a computer-readable storage medium. The computer-readable storage medium may include program instructions, data files, and data structures solely or in combination. Program instructions recorded on the storage medium may have been specially designed and configured for the present invention, or may be known to or available to those who have ordinary knowledge in the field of computer software. Examples of the computer-readable storage medium include all types of hardware devices specially configured to record and execute program instructions, such as magnetic media, such as a hard disk, a floppy disk, and magnetic tape, optical media, such as compact disk (CD)-read only memory (ROM) and a digital versatile disk (DVD), magneto-optical media, such as a floptical disk, ROM, random access memory (RAM), and flash memory. Examples of the program instructions include machine code, such as code created by a compiler, and high-level language code executable by a computer using an interpreter. The hardware devices may be configured to operate as one or more software modules in order to perform the operation of the present invention, and the vice versa.

The teachings of the principles of the present invention may be implemented by a combination of hardware and software. Furthermore, the software may be implemented as an application that is actually implemented on a program storage unit. The application may be uploaded to a machine including a specific architecture and executed by the machine. The machine may be implemented a computer platform having pieces of hardware, such as one or more central processing units (CPUs), computer processors, random access memory (RAM), and input/output (I/O) interfaces. Furthermore, the computer platform may include an operating system and micro instruction code. In this case, a variety of the aforementioned processes and functions may be part of the micro instruction code, part of the application, or a specific combination of them, which may be executed by various processing devices including a CPU. In addition, a variety of other peripheral devices, such as an additional data memory unit and a printer, may be connected to the computer platform.

It is to be understood that actual connections between the system components or the process function blocks illustrated in the accompanying drawings may change depending on a method of programming the principles of the present invention because some of the system components and some of the methods are implemented in software. If the teachings are given, those skilled in the art may conceive the implementation examples or configurations of the principles of the present invention and their similar implementation examples or configurations.

As described above, in accordance with an embodiment of the present invention, only information required by a user can be scrapped in a document file. In particular, important parts of a PDF file can be extracted and stored so that they are suitable to be viewed on the limited screen of the display of a mobile terminal.

Furthermore, in accordance with an embodiment of the present invention, security can be improved because only a non-confidential region is extracted and copied from a document file and a region set as a confidential region is not copied.

Furthermore, in accordance with an embodiment of the present invention, a separate central management server is not required because a document file can be directly shared among users and scrapping can be performed among users. Furthermore, excellent lightness and security are achieved because a document file is opened in a streaming manner among users without storing a separate document file when the document file is shared among the users.

As described above, the apparatus and method for editing a document according to the embodiments of the present invention are not limited and applied to the configurations and methods of the aforementioned embodiments, and all or some of the embodiments may be selectively combined and configured so that the embodiments may be modified in various ways.

What is claimed is:

1. A method of editing a document, the method comprising:
   accessing, by a streaming execution unit, a second terminal of a second user via a first terminal of a first user;
   visualizing, by the streaming execution unit, a second document file, which is selected by the first user in the first terminal and is a document file of a predetermined sharing folder of the second terminal, on a display unit of the first terminal in a streaming manner; and
   extracting, by an edited document generation unit, an area of interest from the second document file visualized on the display unit of the first terminal in a streaming manner in response to a manipulation of the first user, and generating, by the edited document generation unit, an edited document;
   wherein the document file is a portable document format (PDF) file,
   wherein generating the edited document comprises:
      generating an editing space file that is an initial file used to generate the edited document;
      generating a clipping mask used to extract the area of interest;

extracting the area of interest corresponding to the clipping mask from the second document file;

copying the extracted area of interest to the editing space file, and processing the edited document;

determining an entity attribute of the extracted area of interest; and determining a copy region, which belongs to the extracted area of interest and will be copied to the editing space file, based on the security of the extracted area of interest and the entity attribute;

wherein determining the copy region comprises:

deleting data corresponding to a part that belongs to the extracted area of interest and that corresponds to the confidential region, thereby determining the copy region; and performing effect processing set by a user or predetermined effect processing on the region deleted by a data deletion unit;

wherein deleting the data comprises:

computing a minimum square-shaped bounding box including a clipping line, that is, a boundary line of the clipping mask;

converting a page coordinate system, that is, a coordinate system based on a page of the second document file, into an image coordinate system, that is, a coordinate system based on an image present in the second document file;

converting the bounding box into the image coordinate system;

deleting data, corresponding to the confidential region included in a conversion bounding box and a part placed outside the conversion bounding box, based on the conversion bounding box converted into the image coordinate system; and performing the effect processing comprises performing shading processing on the deleted region in order for a user not to view the part corresponding to the confidential region.

2. The method of claim 1, wherein:

the second document file is configured to include an entity corresponding to at least one of a letter, an image and a moving image; and extracting the area of interest comprises extracting the area of interest from the second document file in a state in which an entity attribute are maintained so that the entity included in the extracted area of interest is able to be selected and copied.

3. The method of claim 1, wherein:

the clipping mask is formed by a clipping line that is a boundary line having a specific shape in accordance with user settings or predetermined settings; and extracting the area of interest comprises extracting a region within the clipping line from the second document file as the area of interest.

4. The method of claim 1, wherein:

the second document file is configured to comprise a predetermined confidential region and a non-confidential region; and generating the edited document further comprises determining security of the extracted area of interest by determining whether the extracted area of interest corresponds to either the confidential region or the non-confidential region.

* * * * *